United States Patent [19]

Mueller

[11] 4,298,331
[45] Nov. 3, 1981

[54] CONTAINER FABRICATING MACHINE

[75] Inventor: Martin Mueller, Wonderlake, Ill.

[73] Assignee: Owens-Illinois, Inc., Toledo, Ohio

[21] Appl. No.: 92,892

[22] Filed: Nov. 9, 1979

[51] Int. Cl.³ .............................................. B29C 27/00
[52] U.S. Cl. ..................................... 425/393; 264/230
[58] Field of Search .................. 425/391, 393; 264/230

[56] References Cited

U.S. PATENT DOCUMENTS

| | | | |
|---|---|---|---|
| 2,792,593 | 5/1957 | Hardgrove | 425/525 |
| 3,967,991 | 7/1976 | Shimono | 264/230 X |
| 3,970,492 | 7/1976 | Amberg | 156/85 |
| 3,995,740 | 12/1976 | Amberg | 206/520 |
| 4,053,346 | 10/1977 | Amberg | 156/446 X |
| 4,072,549 | 2/1978 | Amberg | 156/86 |
| 4,077,829 | 3/1978 | Pupp | 156/446 |
| 4,108,347 | 8/1978 | Amberg | 229/1.5 B |
| 4,111,738 | 9/1978 | Amberg | 425/393 X |
| 4,121,402 | 10/1978 | Cress | 53/452 |
| 4,215,460 | 8/1980 | Amberg | 264/230 X |

Primary Examiner—Thomas P. Pavelko
Attorney, Agent, or Firm—David R. Birchall; Myron E. Click; David H. Wilson

[57] ABSTRACT

A fabricated cup or other container in which the sidewall is formed from a rectangular sheet-like blank of an oriented thermoplastic material, the blank having its ends joined to one another to form a cylindrical sleeve with a liquid-tight seam, the blank having a relatively high degree of orientation extending circumferentially of the sleeve, the fabrication of the sidewall from the sleeve being accomplished by telescoping the sleeve over a substantially cylindrical mandrel, by exposing the sleeve to heat to cause it to shrink into conformity with the external configuration of the mandrel and by completing the cup by pressing the bottom and forming a beaded rim.

The apparatus for fabricating the container includes a mandrel carrying drum that revolves through a series of work stations that insert a sleeve of thermoplastic material on the mandrel, subjects it to softening heat which permits the sleeve to conform to the mandrel and protrude in part therefrom, presses the protruding material of the sleeve into a container bottom while substantially simultaneously forming a bead-like rim on the container and ejecting the completed container from the mandrel.

25 Claims, 16 Drawing Figures

CONTAINER FABRICATING MACHINE

BACKGROUND OF THE INVENTION

For several years it has been recognized that containers such as cups for drinking purposes, and especially for the short term retention of hot beverages such as coffee, can be formed from various plastic materials. One very popular container material has been expanded polystyrene, both of the expanded bead, as well as foam sheet stock material.

A well known container of the above mentioned type is a one-piece cup which is molded directly from expandable polystyrene beads in a steam chest mold. However, in forming cups of the steam chest variety it is necessary, for purposes of imparting adequate strength, rigidity, liquid impermeability and surface finish, to construct such cups with what today is considered to be a thick sidewall and bottom, especially in relationship to the sidewall thickness of other types of foam sheet stock insulated cups. As a consequence of this added sidewall thickness, it is not possible to package as much product per container as can be accomplished when the sidewall is relatively thin. Thus more overall storage and shipping space is required than a comparable quantity of other types of plastic insulated cups.

Another disadvantage of the so-called steam chest molded cup is that, as an inherent consequence of its mode of manufacture, the external surface of its sidewall can only be decorated subsequent to the manufacture of the container. The necessary post decoration and printing techniques are considerably slower and more expensive than the flexographic and other sheet printing techniques which may be used to decorate sheet material prior to incorporation into containers. As a result, the majority of steam chest molded cups on the market today do not contain a decorated exterior simply because such decoration would have to be applied after the cup is fabricated.

Then too, cups have been made of insulated or expanded thermoplastic materials by cutting an arcuate blank from sheet material and forming it into a frusto-conical container with techniques that are well known in the art of making paper cups. This process of cup fabrication permits the container exterior sidewall to be decorated while the plastic material is in sheet form and prior to the cutting of the arcuate sidewall blanks. By controlling the density of such sheet, it is possible to fabricate a cup with adequate strength, rigidity and liquid impermeability and which has a considerably thinner sidewall than a steam chest molded cup. Also, the ease with which the exterior of the sidewall of such cups can be provided with attractive and sometimes required decoration by predecorating the sheet from which the sidewall blanks are formed, has made it possible for a substantial number of such cups to be decorated in a way which has proven to be quite popular in the trade. One of the inherent disadvantages of such containers is the cost insofar as materials are concerned, in relationship to the steam chest molded cup, because of the scrap which is formed when crescent shaped sidewall blanks are cut from a sheet or web of stock material.

Another known type of insulated or expanded thermoplastic container which has met with some measure of commercial success is a one-piece seamless deep drawn cup which is manufactured by the well known thermoforming process. Such cups can be formed to very close manufacturing tolerances and with excellent stacking features if desired. Once again, the decoration of thermoformed deep drawn cups must be achieved subsequent to their fabrication.

As can be realized from the foregoing discussion, each of the known types of insulated containers referred to has certain advantages which make it well suited for some uses and certain limitations which make it less suited than one of the other types for other uses.

Another variation in the manufacture of cups is also known as of this time. This particular insulated cup combines a wide range of desirable properties, without offsetting limitations, and which, is well suited for a wide range of applications for insulated lightweight cups. The sidewall of such containers can be formed from rectangular blanks and, therefore, without the scrap and inherent expense involved in the severing of crescent-shaped container sidewall blanks from a sheet or web. The sidewall of such cup may be relatively inexpensively provided with attractive, high quality decorative designs. Additionally, such cup may, if desired, be provided with relatively good stacking or nesting characteristics, and with close manufacturing tolerances to provide the reliable denesting which is important in coin-operated vending machine utilization of cups. Relatively inexpensive high quality cups have been fabricated from rectangularly shaped blanks, both in a one-piece, as well as a two-piece version.

The sidewall of either a one-piece or two-piece container is formed from a web of polystyrene or other thermoplastic polymeric sheet material which has a substantial degree of orientation or heat-shrinkability built into the machine direction of the web. Decorative material is applied to the oriented web material and after printing, the web is severed into long strips, each containing the repetitive pattern of individual container blanks. The strips of material are then severed into individual container blanks which are then formed into cylindrical sleeves with the machine direction of the parent web extending circumferentially around the sleeves. In the formation of the sleeve, a liquid tight lapped seam is effected by heat or solvent sealing techniques. A sleeve winding mandrel is employed to form the sleeve to the desired diameter and to make the required side seam. The completed sleeve is then placed on a mandrel having an outer forming surface corresponding to the desired configuration of the inner surface of the container sidewall, whether such sidewall be substantially straight or tapered, such as in a nestable cup. By heating the sleeve while it is so positioned over the mandrel, the sleeve will heat shrink into conforming face to face contact with the forming surface of the mandrel. A separate bottom closure may be affixed to a sidewall formed in this manner, either while the sleeve is still in position on the mandrel, or after it is removed therefrom. Alternatively, a one-piece cup may be formed by starting with a sleeve which is highly oriented in the hoop or circumferential direction, and which exceeds the height of the forming mandrel over which it is to be telescoped by a distance of the order of from one-half to one diameter of the mandrel diametrical dimension at its smaller bottom forming end. The excess portion of the sleeve extends beyond the smaller end of the mandrel. When such a sleeve is exposed to heat, the excess portion thereof will shrink to form an annular planar portion extending inwardly across the smaller end of the mandrel and a relatively small diameter tubulation extending longitudinally from the interior of such planar portion. By the application of opposed compressive forces to such tubulation, while it is at elevated temperature, it can be caused to collapse and to fuse together to close the interior of the annular planar portion in a liquid tight fashion.

The fabrication of either a two-piece cup or a one-piece cup according to the present invention is effective to provide a cup that can be used for beverages or for the packaging of food products.

The apparatus for fabricating one-piece cups in accordance with the method of the present invention includes a drum mechanism that moves in an arcuate path and carries a plurality of spaced apart mandrels, each having an external configuration corresponding to the internal contour and configuration of the cup. The drum carries the attached mandrels through a series of operational subassemblies which function in timed sequenced interrelationship to form the container of the present invention.

With the process and apparatus of the present invention, cups having exceptional properties can be fabricated at a relatively low cost. Because the operation of the present apparatus is continuous in nature, it is extremely smooth in operation, and achieves excellent rates of container production.

It is an object of the present invention to provide an apparatus for the manufacture of cup-shaped containers.

It is an additional object of the present invention to provide a machine for the manufacture of both packing containers and beverage dispensing containers.

These and other objects have been attained in accordance with the present invention in that a machine for the manufacture of cup-shaped containers from a thermoplastic material that shrinks in a controlled fashion under the influence of heat is provided for.

It is also a feature of the present invention to provide a method and apparatus for thermally fabricating a container from a rectangular blank of oriented thermoplastic material without the need for wasting a portion of the material in such blank, and more particularly, it is a feature of the present invention to provide a method and apparatus for fabricating a container from a rectangular blank of oriented thermoplastic material wherein the rim and bottom of the container are formed substantially simultaneously.

DESCRIPTION OF THE PRIOR ART

Containers of one type or another have been produced by different techniques and types of machinery. One such machine is shown and described in U.S. Pat. No. 3,969,173 issued July 13, 1976. The machine involves the wrapping of a rectangularly shaped blank of foam sheet material into a sleeve of cylindrical configuration. The blank of sheet stock is fed to a sleeve winding station where the sleeve is wound on the interior of a hollow cylindrically shaped sleeve winding mandrel. The sleeve is then transferred to a shrink mandrel where, under the influence of heat, it is caused to shrink to the external configuration of the mandrel. A bottom closure is positioned within the bottom edge of the sleeve just prior to shrinkage, thus providing a bottom to the container. The bottom containing container is then passed through a rimming station where a standard bead-type rim is produced on the container. The finished container is then removed from the shrink mandrel.

A related container forming apparatus is shown in U.S. Pat. No. 4,053,346 issued Oct. 11, 1977. Cylindrical shaped sleeves fabricated from predecorated rectangular shaped blanks are produced by introducing the leading edge of the rectangular sheet to a vacuum pickup built into a vertically oriented sleeve winding mandrel. The blank is then wound around the mandrel until the leading and trailing edges are in overlapped position. Heat is then applied, along with pressure, to effect a liquid tight seal along the length of the cylinder. The cylindrical sleeve is then transferred to a shrink mandrel, a bottom closure is positioned within the sleeve and the subsequent application of heat causes the cylindrical sleeve to shrink in controlled fashion into a container. A subsequently positioned rimming station completes the container by forming a standard rim of bead-like appearance. The completed container is ejected from the shrink mandrel.

U.S. Pat. No. 3,970,492 issued July 20, 1976 sets forth the method of producing a container wherein a rectangular sheet of thermoplastic material is formed into a tubular shape having overlapped end portions that are sealed together by directing heated air between the end portions to soften their facing surface and pressing the end portions together to form a seam. A two-piece container can be formed by sealing a bottom disc member of foam material to the end of the sidewall, and a one-piece container can be formed by collapsing and fusing the end of the sidewall sleeve to close and form the bottom of the container.

Another related U.S. Pat. No. 3,995,740 issued Dec. 7, 1976 sets forth the article in the form of a container produced from a lapped, seamed cylindrical sleeve. Either a two-piece or one-piece container is disclosed.

U.S. Pat. No. 4,072,549 issued Feb. 7, 1978 sets forth an apparatus and method for the manufacture of a container made from a cylindrical sleeve. The particular sleeve is conventional in form, however, it is wound on a mandrel that has its longitudinal axis oriented in a horizontal attitude.

A one-piece container is shown in U.S. Pat. No. 4,108,347 issued Aug. 22, 1978. The container is produced by permitting a sleeve of oriented sheet stock to protrude over the end of a shrink mandrel and form an elongate neck portion of small diameter. Subsequent pinching shut the elongate neck, removal of the resulting moile and pressing of the bottom results in a container which can be rimmed by conventional techniques.

Yet another technique and apparatus for the formation of a foam sheet stock container is to be found in U.S. Pat. No. 4,077,829 issued Mar. 7, 1978. A cylindrically shaped sleeve is formed on a mandrel and a bottom closure is positioned within the confinement of one end of the sleeve. While remaining on the mandrel upon which it was wound, the sleeve and prepositioned bottom closure is subjected to heat, thus shrinking the sleeve to conformity with the mandrel. Subsequent pressure applied to the bottom of the container assures the integrity of the seal between the sidewall of the container and the bottom closure.

Another approach to the formation of a container made from a rectangular shaped blank of foam sheet material is set forth in U.S. Pat. No. 4,121,402 issued Oct. 24, 1978. In this version of container manufacture the rectangular blank is severed from its continuous strip stock. The blank is then translated, at a right angle to its original direction, to an elongate stationary mandrel where the blank is essentially progressively folded about the mandrel as it moves beneath and along the mandrel. The completed sleeve is coupled with an end closure, placed on a shrink mandrel and subsequently formed by the influence of heat into a container.

SUMMARY OF THE INVENTION

As can be ascertained from the foregoing discussion, each of the known types of insulated plastic material containers referred to has certain advantages which make it well suited for some uses, and certain limitations which make it less well suited than one of the other types for other uses.

The apparatus, according to the present invention, is well suited for the fabrication of a one-piece container such as a cup. The container can be of tapered sidewall configuration, or the container can have a sidewall that is substantially cylindrical in configuration. The present invention comprises a framework that supports a motor driven drum adapted for stopping at predetermined arcuate intervals as it revolves about a central axis of revolution. The drum supports an array of radially oriented shrink mandrels. Seamed sleeves of oriented plastic material are positioned in telescoped fashion over the mandrels. A portion of the sleeve is permitted to protrude beyond the free end of the mandrel. The mandrel and its accompanying sleeve is translated through an arcuate path that subjects the sleeve to selected treatment of heat from adjacently mounted heat elements, thus causing the oriented sleeve to shrink in a controlled manner to a configuration similar to the mandrel exterior. That portion of the sleeve cantilevered beyond the end of the mandrel shrinks into a small diameter tubular structure that is closed by the compressive action of a bottom pinching mechanism. Subsequent to the closing of the bottom of the heat softened sleeve, the mandrel carrying the sleeve is moved to a work station where the pinched bottom material is compressed against the end of the mandrel to form a liquid-tight bottom in the sleeve. The force utilized in forming the container bottom is also used to form an upset rim on the container. The mandrel carrying the completed container is then indexed to an eject station where the finished container is removed from the mandrel on which it was formed.

DETAILED DESCRIPTION OF THE INVENTION

While the present invention sets forth the preferred embodiment of exemplary apparatus components and methods for the fabrication of containers, it is to be understood that there can be certain variances in portions of the apparatus without limiting the invention to the specific embodiments illustrated and described. The scope of the invention is to be found in the appended claims.

Figure 1:
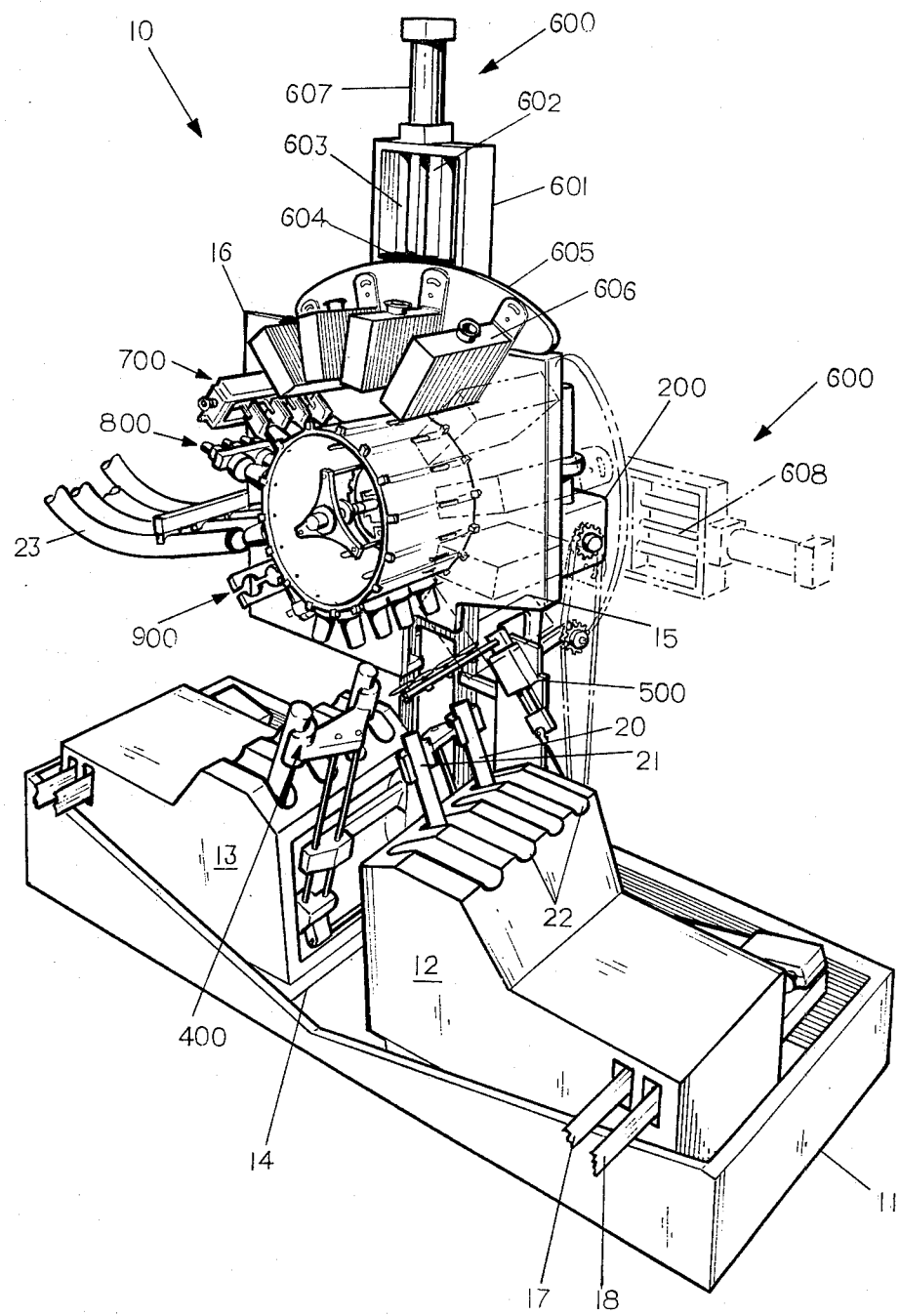
FIG. 1 is an overall perspective of the container forming apparatus with some parts removed for clarity.

FIG. 1 sets forth in perspective view the overall apparatus of the present invention. The numeral 10 has been assigned to represent the apparatus in its entirety. A base support structure 11 is shown at the bottom of FIG. 1. The base support structure is of rectangular configuration and serves two primary functions. First, base 11 provides the necessary support for the sleeve winding mandrel assemblies 12 and 13 which are anchored to the framework 14. Second, base 11 also provides support for the upright column 15 that supports the entire upper portion of apparatus 10. The upright column 15 has attached to its upper end a vertical support plate 16 which is used to anchor and position the remaining subassemblies associated with apparatus 10.

A drum assembly 300 is supported by vertical support plate 16 so that its longitudinal axis is horizontal. The drum assembly 300 rotates about its longitudinal axis and is powered by a power unit 200 which is positioned immediately behind and attached to support plate 16.

A sleeve transfer mechanism 400 is positioned adjacent each sleeve winding mandrel assembly 12 and 13. Immediately above the right hand sleeve winding mandrel assembly 12 is the sleeve positioner subassembly 500 which provides assurance that each sleeve is positioned correctly on the respective container mandrels. An array of heater assemblies 600 is shown to the upper right of the drum assembly 300. A sleeve bottom squeezer subassembly 700 is shown to the upper left of drum assembly 300. Immediately below the bottom squeezer subassembly 700 is a container bottom press subassembly 800. A completed container and ejection apparatus is further shown at 900.

Attention is now directed to the sleeve winding mandrel assembly 12. The comments attributable to sleeve winding mandrel assembly 12 apply equally well to sleeve winding mandrel assembly 13 since both units are of identical construction. The mechanism employed within sleeve winding mandrel assembly is not shown for the sake of brevity since sleeve winders are old in the art and any one of several different sleeve winders would work equally well with overall apparatus 10. It will suffice to point out that a continuous web of oriented foam plastic material such as webs 17 and 18 enter the sleeve winding mandrel assembly 12. The webs 17 and 18 are severed into rectangular blanks within assembly 12 and are wrapped around mandrels 20 and 21 and a liquid-tight side seam is formed on the cylindrically shaped plastic material. The sleeve of plastic material can be formed on each of the mandrels 20 and 21 while the mandrels are in their shown position or it is also contemplated that the mandrels could pivot into the recesses 22 at which position the actual sleeve winding occurs. While two complete sleeve winding assemblies 12 and 13 have been shown, it is also possible to utilize only one sleeve winding assembly and employ four mandrels, each operating in conjunction with recesses 22 and their respective positions. At any rate, as shown in FIG. 1, sleeve winding mandrel assembly 12 accommodates container mandrel positions two and four, and, sleeve winding mandrel assembly 13 in a similar manner accommodates container mandrel positions one and three.

THE POWER UNIT

Figure 2:
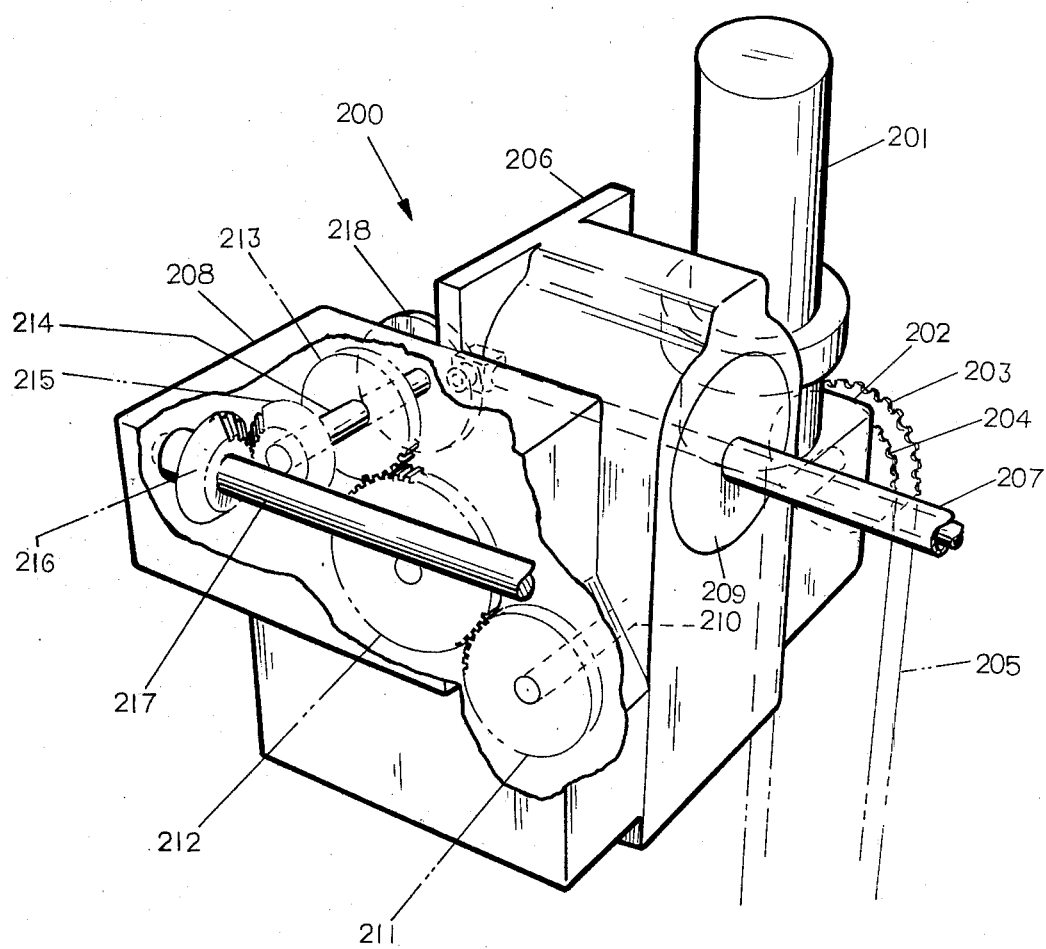
FIG. 2 is a perspective view of the unit that supplies power to the overall apparatus shown in FIG. 1.

FIG. 2 shows, in perspective, the power unit assembly 200 which is shown in brief behind the drum assembly 300 in FIG. 1. A high torque motor 201 is mounted vertically as shown in FIG. 2 and delivers its torque to a gear box 202. The gear box 202 is of the reduction gear type and is considered a standard machine design assembly. Two power takeoffs are available at gear box 202. The first power takeoff is attached to double sprockets 203 and 204 over which is entrained chain drive 205 which supplies power to the lower portion of the overall apparatus. The second power takeoff originating with gear box 202 is not shown in FIG. 2, however, its coupling and utilization is standard and need not be described in detail. The second power takeoff is coupled to a roller gear index drive assembly 206. The index drive assembly is a standard off-the-shelf part which may be purchased from CAMCO, a division of Emerson Electric Company of Chicago, Illinois. The index drive assembly 206 employs within its structure a cam driven arrangement which permits the drum assembly 300 to index, or stop, sixteen times during one complete revolution. A hollow shaft 207 is catilevered in a horizontal direction from the front of drive 206. While shaft 207 does not rotate, the drive disc 209 immediately surrounding shaft 207 does rotate.

A gear box assembly 208 is coupled to a drive shaft 210. Drive shaft 210 contains gear 211 attached at its end. Gear 211 is in turn meshed with gear 212. The torque supplied by gear 212 is delivered to gear 213 which in turn is mounted on drive shaft 214. A bevel gear 215 is attached to the end of drive shaft 214 as shown in FIG. 2. Bevel gear 215 is meshed with bevel gear 216 which is fastened to the main drive shaft 217. The main drive shaft 217 is coupled to a cam, as will be shown later, that provides synchronism for several of the functions performed by the overall apparatus 10 as depicted in FIG. 1. Drive shaft 214 protrudes from its housing and is attached to cam 218 located toward the rear and adjacent to the center line of hollow drive shaft 207.

In its operation, power unit assembly 200 delivers indexed rotation through drive disc 209. The drive disc 209 stops sixteen times during one complete revolution. The drive attached to sprockets 203, 204 is continuous and makes one complete revolution for every two stops of drive disc 209. The main drive shaft 217 makes one complete revolution for every stop of drive disc 209 and cam 218 also makes one complete revolution for every stop of drive disc 209.

THE DRUM ASSEMBLY

Figure 3:
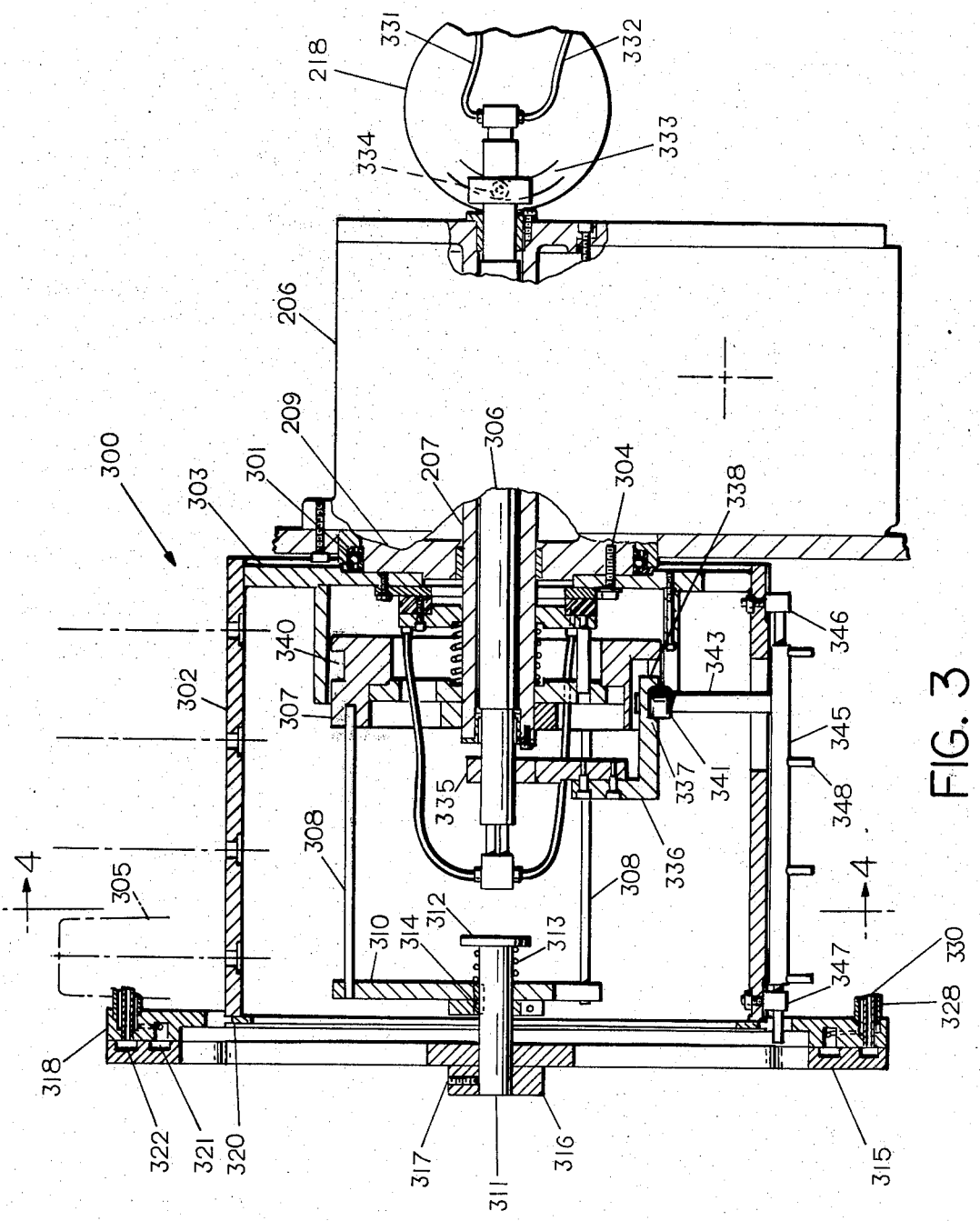
FIG. 3 is a partial side elevational view of the drum assembly taken through the drum shown in FIG. 1.

FIG. 3 is a partial side elevational view of the drum assembly taken through the drum shown in the overall apparatus 10 of FIG. 1. FIG. 3 also shows the housing for the roller gear index drive 206. Power is delivered from drive 206 through drive disc 209 which is supplied a rotational force (not shown) from drive 206. The drive disc 209 rotates on bearing 301 which is carried by the housing associated with drive 206. The drum 302 is cylindrical in configuration and has a centrally apertured end wall 303 which in turn is bolted to drive disc 209 by bolts 304. Drum 302 carries a series of container mandrels 305 which are attached to the exterior of the drum 302 and in radial alignment with the axis of rotation of the drum 302. A hollow nonrotating shaft 207 extends through and along the axis of rotation of drum 302. An axially movable tubular structure 306 extends through nonrotating shaft 207. A cam disc 307 is rigidly fastened to the exterior of nonrotating shaft 207. Three support rods 308 are attached to the front side of cam disc 307. The support rods 308 are parallel to the axis of rotation of drum 302. The front ends of rods 308 are attached to a triangular shaped support plate 310 which can also be seen in FIG. 1. The support plate 310 is centrally apertured and carries therethrough a retaining pin 311. The retaining pin 311 has a flange 312 at its inner end and a compression spring 313 is positioned so that it biases against flange 312 and the back side of support plate 310. Retaining pin 311 is keyed at 314 so that it cannot rotate. The retaining pin 311 passes through a front plate 315 and is anchored to hub 316 by set screw 317. The hub 316 is rigidly attached to front plate 315 which also does not rotate. The front plate 315 abuts against drum ring 318 which does rotate since it is firmly attached to the front edge 320 of drum 302. The interface between stationary front plate 315 and rotating drum ring 318 provides a means for communicating heated air and a vacuum source to the rotating drum. A vacuum carrying groove 321 is arcuately cut into the back face of front plate 315. A concentric hot air carrying groove 322 is positioned radially outboard of groove 321.

Figure 6:
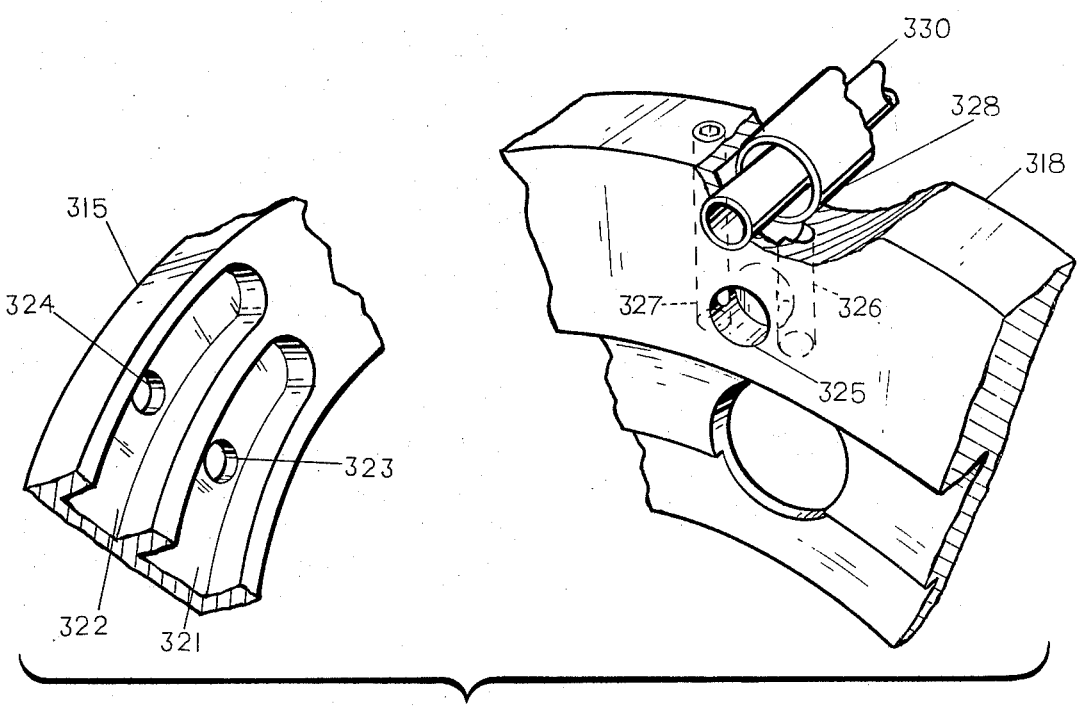
FIG. 6 is a broken away perspective view that shows the fluid delivery system on the front of the drum assembly.

Referring to FIG. 6, an enlarged perspective view is shown of front plate 315, vacuum groove 321, hot air groove 322 and abutting drum ring 318. A vacuum source (not shown) is coupled to aperture 323 and a hot air source is coupled to aperture 324. The vacuum groove 321 communicates with aperture 325 which is located in drum ring 318. From aperture 325 the vacuum line passes through bores 326 and 327 to the end of tube 328. The vacuum is maintained in the space between tube 328 and smaller tube 330 which in turn communicates with hot air groove 322 in front plate 315. The utilization of the hot air and vacuum sources will be commented on below.

Figure 4:
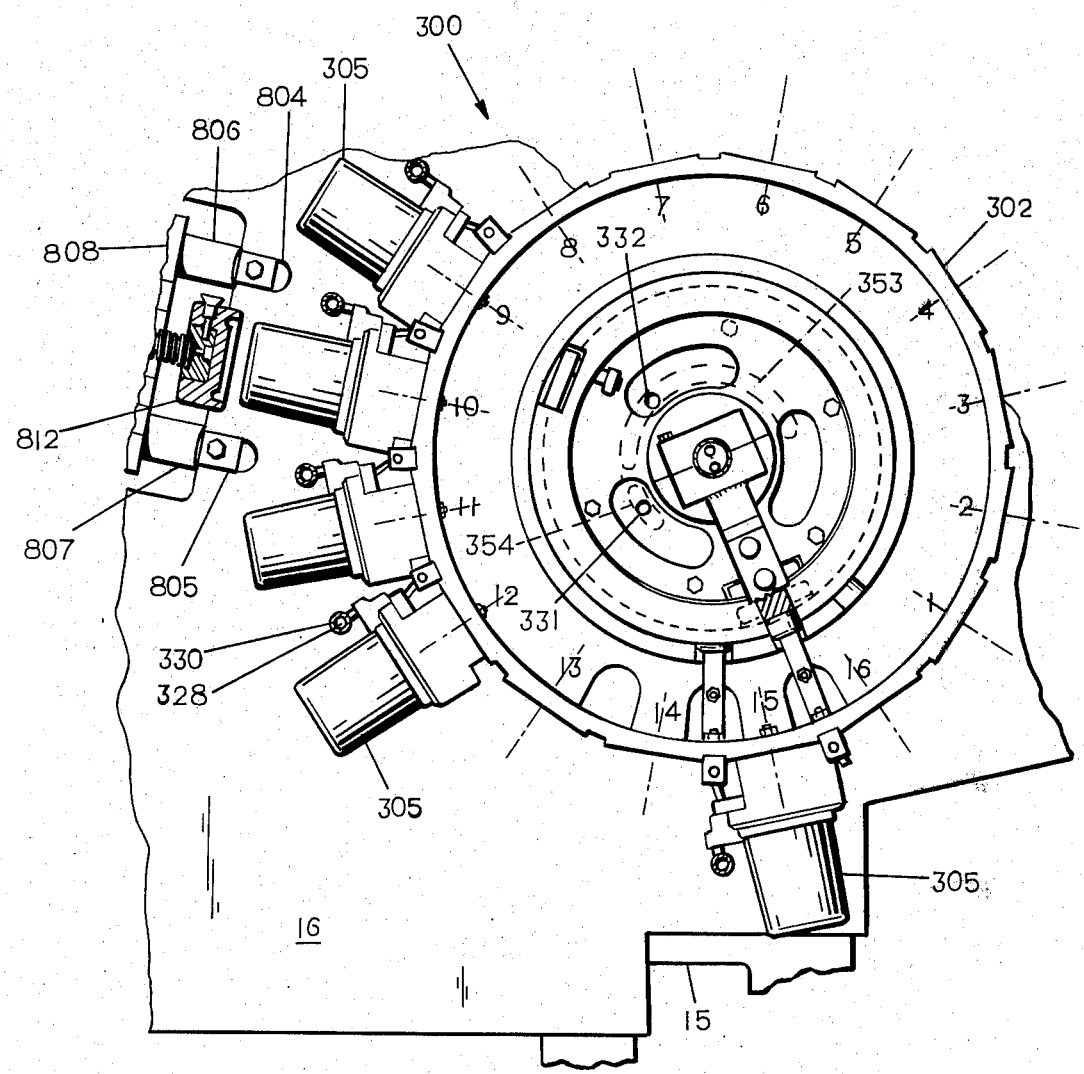
FIG. 4 is a front sectional view taken along the lines 4—4 of FIG. 3.

In FIG. 4, which is a sectional front view through the drum assembly 300, the array of arcuately spaced container mandrels 305 can be seen. The vacuum tube 328 and the hot air tube 330 are shown at the side of each row of container mandrels 305. A passageway communicates from the hot air tube 330 to the base of each container mandrel, thus providing the means to heat the end of the sleeve from which the container rim is formed. FIG. 4 also shows a portion of the bottom closure press assembly 800. For convenience, the various arcuate positions of each indexing or station of the drum 302 have been numbered in counterclockwise fashion.

Figure 5:
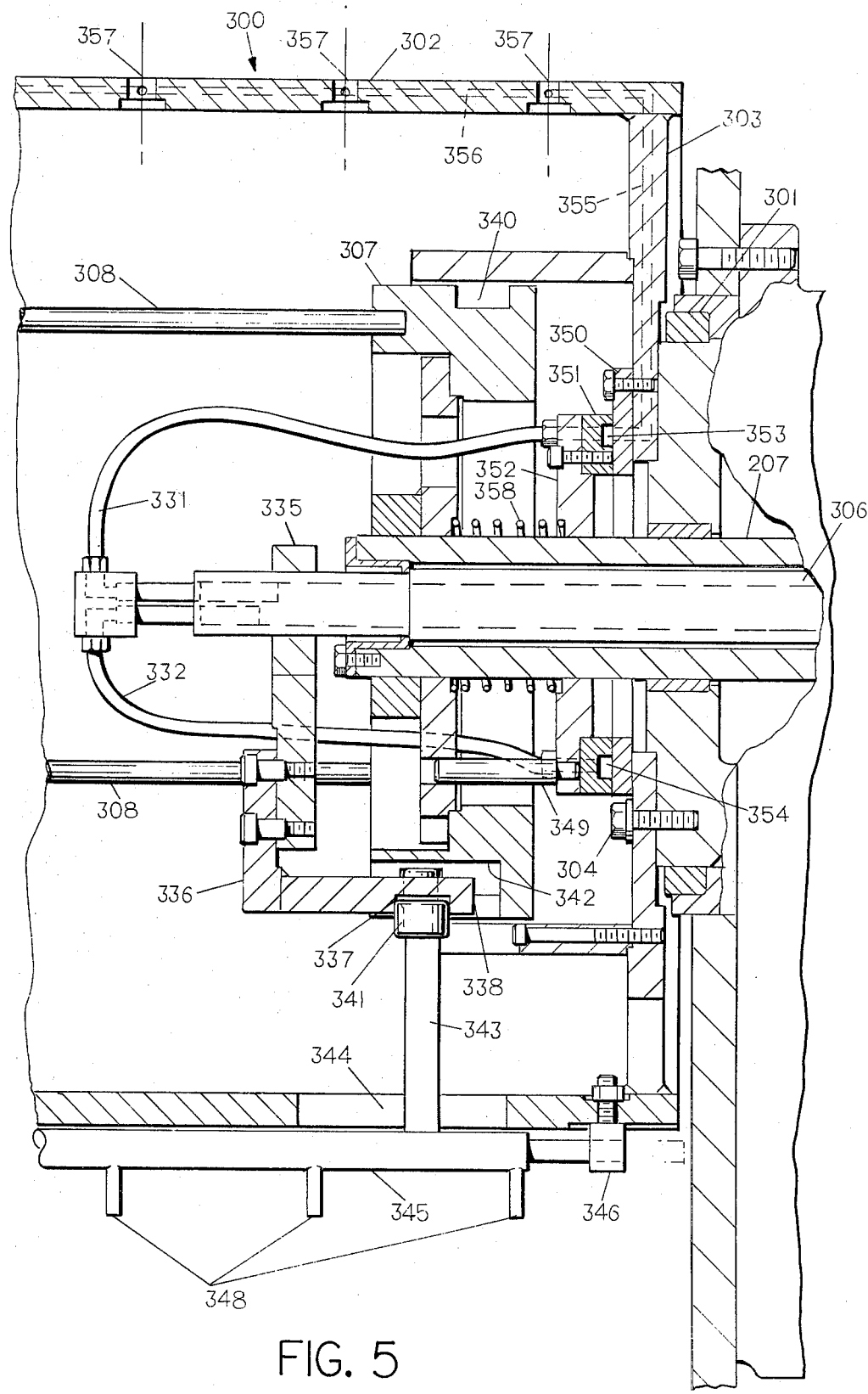
FIG 5. is an enlarged partial side elevational view similar to FIG. 3.

FIG. 5 is an enlarged sectional side elevational view showing the mechanism positioned within the drum 302. As previously pointed out, the nonrotating hollow shaft 207 contains an axially movable tubular structure 306 positioned therein. The tubular structure 306 serves two functions; first, it is utilized as a conduit for air line 331 and also vacuum line 332. Second, the axial movement of tubular structure 306 actuates a control mechanism associated with the rim forming function of container mandrels 305. Referring to FIG. 3, cam 218 can be seen at the rear of the roller gear index drive 206. Cam 218 contains a cam track 333 positioned in the front face as viewed in FIG. 3. A cam follower 334 is attached to the right hand protruding end of tubular structure 306. As cam follower 334 traverses cam track 333, tubular structure 306 is caused to move back and forth. Referring now to FIG. 5 and the left hand end of tubular structure 306, a clamp bar 335 is attached to tubular structure 306 and also to angled cam mover 336. The cam mover 336 contains a slot 337 in its free end 338. As tubular structure 306 moves back and forth under the influence of cam 218, the slot 337 moves into and out of alignment with cam groove 340 which is situated in the outer periphery of cam disc 307. A cam follower 341 is positioned in cam groove 340 and remains therein as it progresses around the stationary cam groove 340. When the cam follower 341 reaches the slot 337 it can be pulled to the left and out of cam groove 340 since it is free to travel in groove 342 which is milled in an axial direction in the rim of cam disc 307. As cam follower 341 is moved in an axial direction out of cam groove 340, the arm 343 to which it is attached also moves in slot 344 which is cut in and through the cylindrical shell of drum 302. Arm 343 is rigidly attached to slide rod 345 which is held in sliding position by end restraints 346 and 347 (FIG. 3). The slide rod 345 contains cam pins 348 which activate rim expanding segments (not shown) in the base of the container mandrels 305. Within the drum 302 and tracking in cam groove 340 are sixteen cam followers 341.

Attention is now directed to the central section of FIG. 5. A hardened washer-like ring 350 is attached to the inside face of end wall 303. The ring 350 rotates with end wall 303 and the remainder of the drum 302. A softer material stationary manifold ring 351 is attached to the right hand side of support disc 352 which can slide along the exterior of hollow shaft 207. Support disc 352 is prevented from rotating by pin 349 which is contained by the cam disc 307. A vacuum groove 353 and a pressure groove 354 are positioned in manifold ring 351. The grooves 353 and 354 each extend an arcuate extent around the face of manifold ring 351. The exact location of the air and vacuum grooves has been distorted in FIG. 5 for clarity. Reference may be had to FIG. 4 which shows the arcuate extent of pressure groove 354 and vacuum groove 353. The previously mentioned washer-like ring 350 has sixteen equally spaced apertures (not shown) which corresponds to all sixteen container mandrel 305 stations around the drum 302. Each aperture in ring 350 communicates with a radially aligned bore 355 which is positioned in end wall 303. The bore 355, in turn, communicates with bore 356 which traverses the entire axial extent of drum 302 and which is connected to apertures 357 which permit communication with the base structure of container mandrels 305. Thus from the aforegoing discussion, it becomes apparent that there are sixteen vacuum or air lines running from the rows of container mandrels 305 to the washer-like ring 350. As drum 302 revolves about its axis of revolution, there is a certain prescribed time when some of the bores 355, 356 are subjected to a vacuum, and for another prescribed time, the same bores 355, 356 are subjected to pressurized air. To prevent the loss of air at the interface between the manifold ring 351 and stationary washer-like ring 350, a compression spring 358 is positioned between support disc 352 and cam disc 307.

THE SLEEVE TRANSFER UNIT

Figure 7:
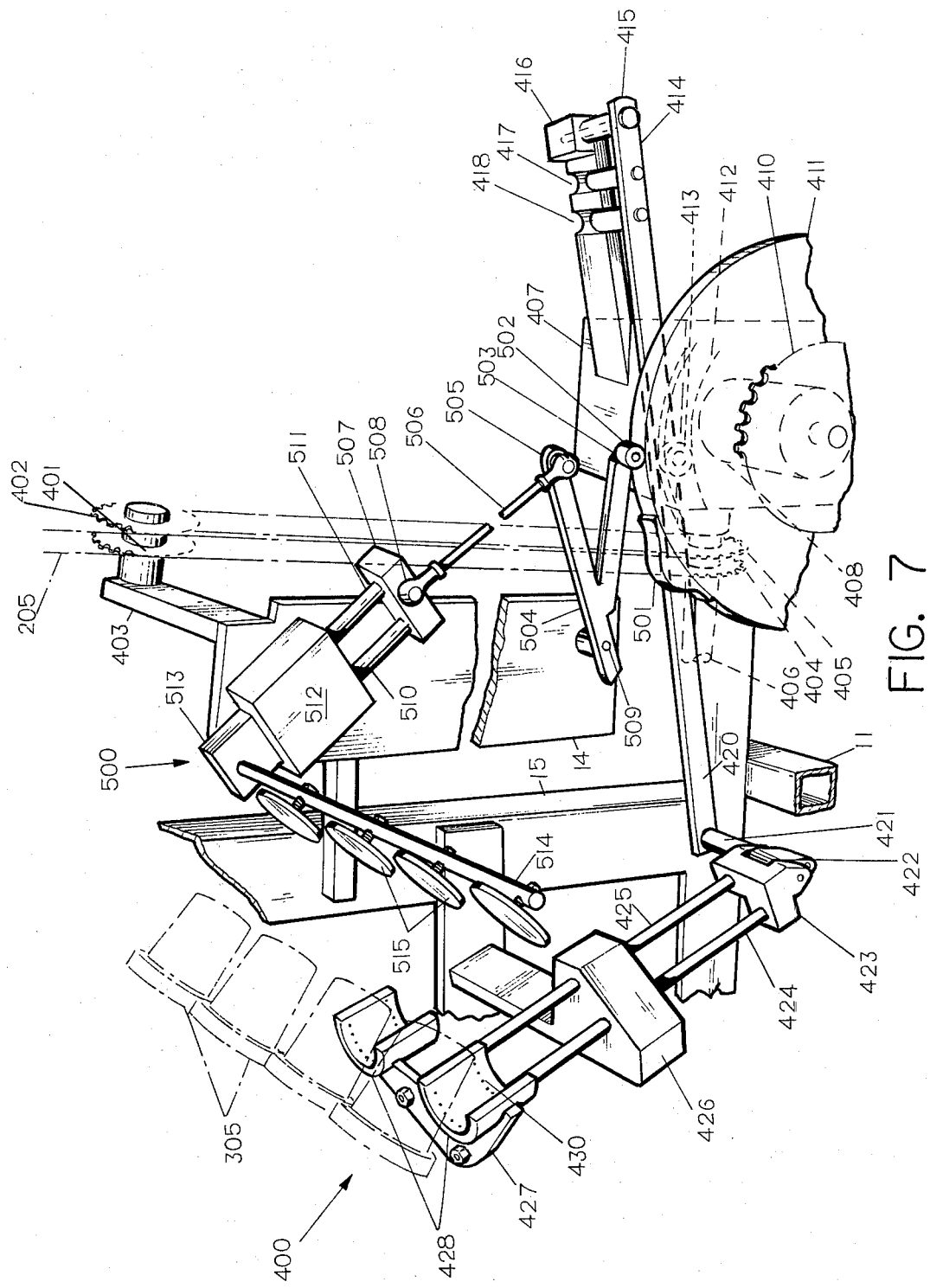
FIG. 7 is a perspective part in section view that shows the sleeve transfer and sleeve positioner assemblies.

FIG. 7 is a perspective view that shows the sleeve transfer assembly. As sleeves are wound on the sleeve winding mandrel assemblies 12, 13 shown in FIG. 1, the sleeves thus produced are then transferred to container mandrels 305 which are located on the drum assembly 300. The sleeve transfer unit 400 is positioned intermediate the sleeve winding mandrel assemblies 12 and 13 and the drum assembly 300.

Attention is now directed specifically to FIG. 7. Power is delivered to the sleeve transfer unit 400 by means of chain drive 205 which in turn is powered by the power unit 200 shown in FIG. 2. Chain drive 205 passes over idler sprockets 401 and 402 which are supported by bracket 403. The lower extent of chain drive 205 is engaged by sprockets 404 and 405. Sprockets 404 and 405 are immobilized on shaft 406. Shaft 406 is tied into gear box 407 which is mounted on the overall base support structure 11. When two sleeve winding mandrel assemblies such as 12 and 13 are utilized, it is necessary to have two sleeve transfer units 400, however, since the units are essentially the same, it will suffice to describe only one such unit herein. It is to be understood that shaft 406 can also deliver power to a gear box associated with the sleeve transfer unit which is not shown in detail in FIG. 7, but which is shown in general in FIG. 1. A power output shaft 408 is cantilevered from the front of gear box 407 and it delivers rotational power to sprocket 410 which in turn is the power input to the sleeve winding mandrel assembly 12. In those instances when sleeve winding mandrel assembly 12 contains a full complement of winding mandrels, that is enough to supply sleeves to all rows of container mandrels on the drum assembly 300, additional power to other sleeve winding mandrels is not necessary.

In addition to powering the sleeve winding mandrel assembly 12, power output shaft 408 is attached to cam wheel 411. Cam wheel 411 is essentially in the configuration of a disc and on the back planar side of the cam wheel 411, a cam groove 412 is machined. The cam groove 412 contains a cam follower 413 which is in turn fastened toward the central extent of bar 414. Bar 414 is pivoted for rotary movement at pin 415 which is anchored in the end of support bar 416. Extra attachment points 417 and 418 are provided so that the effective length of bar 414 can be readily changed. A change in the length of bar 414 affects the distance a sleeve may be transported and provides for the movement of sleeves of different overall length which are required for the manufacture of containers having different capacity. The end of arm 414 most remote from pin 415 is designated as 420 and moves through an arcuate extent as cam follower 413 traverses the noncircular portion of cam groove 412. A cantilevered rod 421 is attached to the end 420 of bar 414. Rod 421 is pivotably attached through an articulated linkage 422 to a support block 423. A pair of guide rods 424 and 425 are ridigly anchored in support block 423. The guide rods 424 and 425 pass through guide block 426 which is rigidly attached to a portion of upright column 15. The guide rods 424 and 425 are fastened at their upper ends to sleeve transfer head 427. The sleeve transfer head 427 contains a plurality of semicircular pads 428 which are equipped with a series of vacuum pickup apertures 430. The vacuum is supplied via a hollow interior situated within the pads 428 that is coupled to a vacuum source (not shown).

The sleeve transfer head 427 is shown equipped for the transporting of two sleeves, however, in those instances where, for example, a four station sleeve winding mandrel is employed, the sleeve transfer head 427 can be modified merely by the addition of two additional semicircular pads 428. The oscillatory motion provided by the above described sleeve transfer unit permits it to pick up sleeves from a stationary sleeve winding mandrel and transport one or more sleeves to container mandrels that are positioned on a rotating drum such as that shown at 300.

THE SLEEVE POSITIONER

After the sleeve transfer unit 400, or units, has transferred the sleeves from the sleeve winding mandrel assembly 12, and in some instances 12 and 13 combined, the sleeves are positioned on the container mandrels 305, however, the sleeves are not so positioned with any great degree of accuracy. To accurately position the sleeves on the container mandrels, a special sleeve positioner has been incorporated in overall apparatus 10.

Returning once again to FIG. 7, it can be observed that cam wheel 411 is generally circular on its peripheral surface except at cam raiser 501. The increased radial extent of cam raiser 501 reacts with cam follower 502 which is attached to one arm 503 of a bifurcated crank 504 which is pivoted at 509. The other arm 505 of crank 504 is attached to connecting rod 506. The connecting rod 506 pivots and is attached at its upper end 508 at support block 507. The support block 507 has connected thereto rods 510 and 511 which are supported by retaining block 512. A slide bar 513 protrudes beyond the upper extent of retaining block 512. Rods 510 and 511 are attached to the lower end (not shown) of slide bar 513. A cantilevered rod 514 is fixed in the upper end of slide bar 513. A series of push pads 515 are attached along the length of cantilevered rod 514. The push pads 515 coact with the sleeves which are positioned on the container mandrels 305 carried by the drum assembly 300. A portion of the container mandrels 305 is shown in dotted relief in the left hand side of FIG. 7.

THE HEATER ASSEMBLY

Referring to FIG. 1, two heater assemblies 600 have been shown. Since both heater assemblies 600 are identical, reference herein will be made only to the assembly mounted at the top of overall apparatus 10. A support frame 601 is attached to the top edge of vertical support plate 16. The support frame 601 contains two vertically aligned parallel spaced apart rods 602 and 603. A mounting block 604 is positioned on rods 602 and 603. A support plate 605 is attached to mounting block 604. Four identical heaters 606 are pivotably supported on the front face of support 605. An actuator cylinder 607 is fixed to the top of support frame 601. The actuator rod 608 passes through an aperture in the top of support frame 601 and has its end coupled to the top of mounting block 604. Thus when the actuator rod is retracted, all of the heaters 606 will be moved away from the drum assembly 300.

Figure 8:
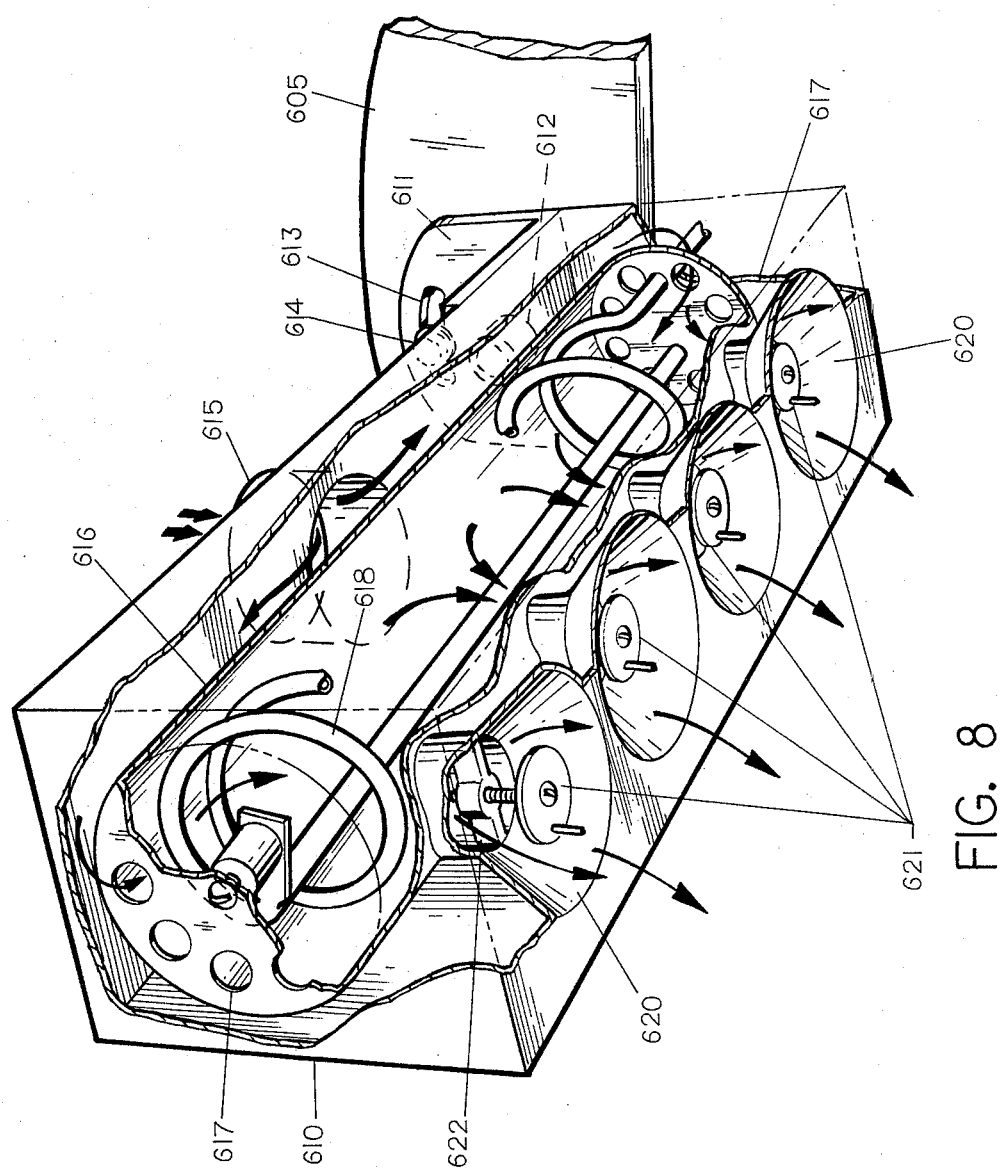
FIG. 8 is a perspective view of one of the heater units shown in FIG. 1.

FIG. 8 shows in perspective the individual heater 606. An outer cover 610 provides a jacket for the heat dispensing element therein. An end plate 611 is pivotably mounted to support plate 605 at location 612. The top of end plate 611 contains an arcuately shaped aperture 613 through which a clamp fastener 614 is utilized to fix the position of heater 606. A cylindrically shaped air inlet 615 is located in the top of outer cover 610, thus providing air ingress to the interior of outer cover 610. A heat element support tube 616 is mounted within outer cover 610. A series of apertures 617 is placed in the end walls of support tube 616. An electrical heating element 618 is spiraled throughout the interior length of support tube 616 and supported at both ends thereof. Four air exit ducts 620 are positioned in the bottom of support tube 616. The air exit ducts 620 are flared at their bottom edges and contain an air adjustment screw 621 which is supported by centrally threaded anchor bar 622 which is positioned in the throat of exit duct 620. The adjustment screws 620 each have a handle for rapid and accurate adjustment of the heated air as it exits from the exit ducts 620. Thus from the aforegoing discussion, it can be ascertained that heated air can be accurately directed toward the top of each container mandrel 305 to aid in the controlled shrinkage of the sleeve carried by the mandrel 305.

THE BOTTOM SQUEEZER

Figure 10:
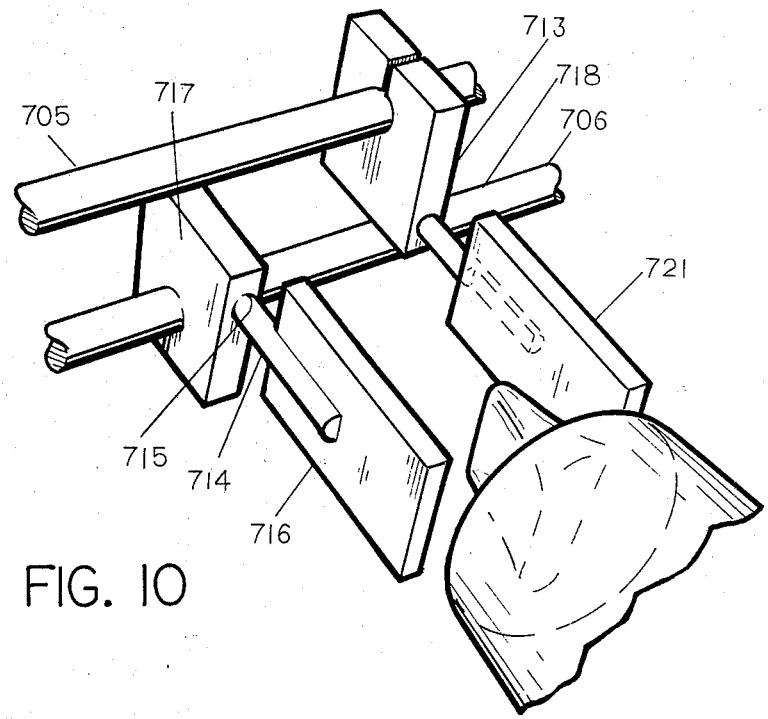
FIG. 10 is an enlarged perspective that shows the end of the sleeve after it has been closed.
Figure 9:
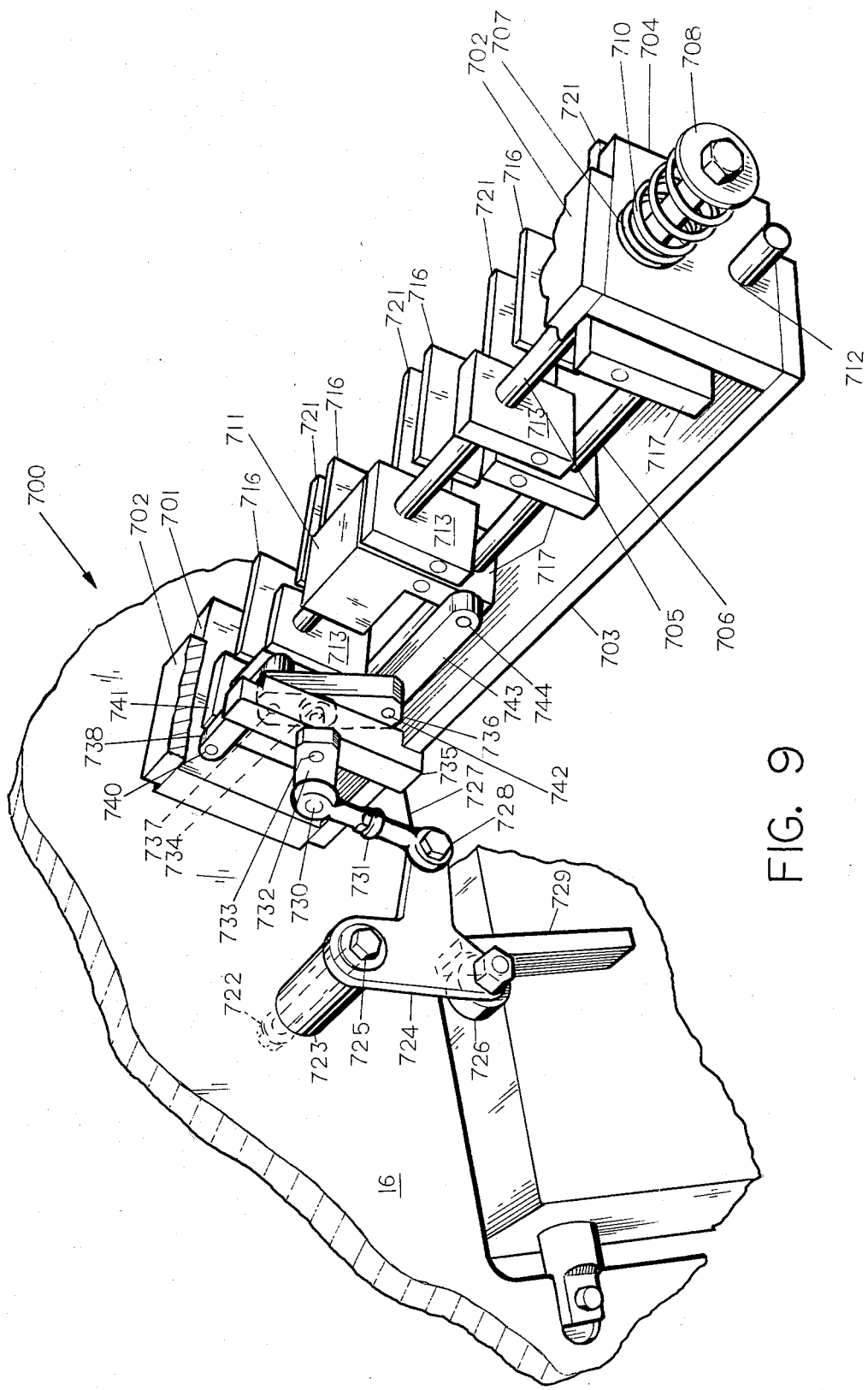
FIG. 9 is a perspective, part in section, that shows the operating mechanism of the sleeve squeezer.

In order to assure that each sleeve will form a good container, the bottom squeezer 700 is used to squeeze or close the already shrunken portion of the sleeve that protrudes beyond the end of the container mandrel. FIG. 9 and FIG. 10 show in perspective the apparatus utilized to effect the closing of the sleeve end. FIG. 9 shows the vertical support plate 16 broken away except for the bottom squeezer and the actuating mechanism. A base attachment 701 is attached to the front side of support plate 16. A top plate 702 and a bottom plate 703 are attached to base attachment 701. Plates 702 and 703 are parallel oriented and spaced apart. An end plate 704 ties together the cantilevered ends of plates 702 and 703. A top rod 705 and a bottom rod 706 are also positioned parallel to one another and spaced one from the other. The left hand end of top rod 705 passes through an aperture in both base attachment 701 and support plate 16. The right hand end of top rod 705 likewise passes through an aperture 707 in end plate 704. The aperture through which top rod 705 passes are of larger diameter than top rod 705, thus assuring free movement therethrough by top rod 705. A stop washer 708 is anchored at the right hand end of top rod 705. A compression spring 710 is interdisposed between stop washer 708 and the face of end plate 704. Thus it can be seen when top rod 705 is biased in a direction to the left, spring 710 will exert a force in the opposite direction to return top rod 705 to its unbiased position. In addition to the support provided by base attachment and end plate 704, top rod 705 is also supported by guide block 711 which is positioned around top and bottom rods 705, 706.

In a similar manner, bottom rod 706 is adapted for sliding movement through apertures in the base attachment 701 and end plate 704. The free end of bottom rod 706 can be seen as it protrudes through aperture 712 in end plate 704. The left hand end of bottom rod 706 contains a compression spring and washer arrangement (not shown) similar to what has already been described with respect to top rod 705.

Referring now to FIG. 10, the top and bottom rods 705, 706 are shown in part. A clamp block 713 is positioned on top rod 705. A cantilevered attachment pin 714 is positioned in bore 715 in the lower portion of clamp block 713. A squeeze pad 716 is attached to the cantilevered end of attachment pin 714. The squeeze pad 716 may be fabricated of nonsticking material or else so coated so that it can coact with the heated plastic of the end portion of the sleeve. In a similar fashion, bottom rod 706 contains clamp block 717 attached thereto. An attachment pin 718 is immobilized within bore 718 which is positioned in clamp block 717. A squeeze pad 721 is attached to the free end of attachment pin 718. While attachment pins 714 and 718 are normally fixed in position during the operation of the apparatus, they can be adjusted to move the squeeze pads 716 and 721 closer or further away from the end of the sleeve. If desired, squeeze pads can be rotated a slight amount. In order for squeeze pads 716 and 721 to exert a clamping force on the sleeve, top and bottom rods 705 and 706 must move in opposite directions.

Attention is once again directed to FIG. 9. It can be seen there are four sets of squeeze pads 716, 721 mounted respectively on top and bottom rods 705 and 706. The top and bottom rods 705 and 706 are normally biased by springs 710 so that squeeze pads 716 and 721 are in their spaced apart or open position. In order to cause the squeeze pads 716 and 721 to move together or to a closed position, the following actuating mechanism is utilized. A bolt 722 is anchored in vertical support plate 16 as shown in FIG. 9. A spacer 723 is positioned over the shaft of bolt 722. A bell crank 724 is pinned for rotational movement at aperture 725. A cam follower 726 is positioned on one arm of bell crank 724. A link rod 727 is attached to the other arm of bell crank 724. The link rod 727 is free to pivot at both ends 728 and 730. If desired, link rod 727 can be made adjustable as depicted at 731. The end 730 of link rod 727 is attached to lever arm 732 which is attached to shaft 733. Shaft 733 is journaled through bore 734 in support bar 735 which is anchored to top and bottom plates 702 and 703. The end of shaft 733 opposite lever arm 732 is rigidly attached to throw bar 736. The upper end of throw bar 736 is pivoted about pin 737 which is immobilized in link bar 738 which in turn is pinned at its opposite end for movement about pin 740. Pin 740 is immobilized in clamp block 741 which is anchored on top rod 705. The bottom end of throw bar 736 is pivoted about pin 742 which is fixed in the end of link bar 743. The opposite end of link bar 743 is pinned for movement by pin 744 which is fixed in an attachment to bottom rod 706.

When bell crank 724 is rotated in a counterclockwise direction, link rod 727 moves upward, thus causing lever arm 732 to rotate in a clockwise direction. Thus throw bar 736 also rotates clockwise, pulling link bar 738 to the right and link bar 743 to the left. Since link bars 736 and 738 are attached respectfully to top and bottom rods 705 and 706, the rods also will move from their normal spring biased open position to a closed position, thus causing squeeze pads 716 and 721 to move together to a closed position. The cam follower 726 is activated by cam bar 729 which is attached to the front face of slide block 808.

BOTTOM CLOSURE PRESS

Figure 11:
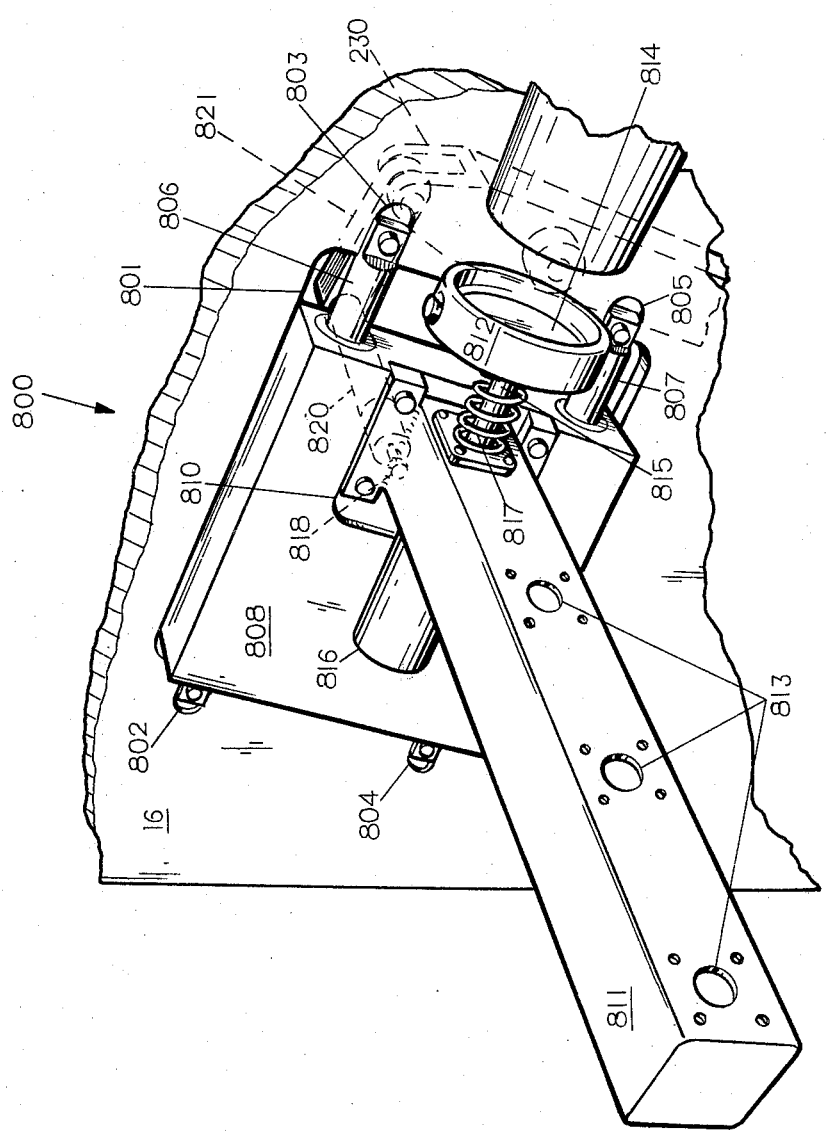
FIG. 11 is a perspective view, part in section, which shows the bottom closure press apparatus.

After the preheated and squeezed shut sleeve ends have passed through the squeeze apparatus 700, the container mandrels, which are mounted on the drum assembly 300, index to the bottom closure press 800 as depicted in FIG. 11.

FIG. 11 shows in perspective the bottom closure press and its associated parts. The vertical support plate 16 is shown part in section. A rectangular shaped window or cutout 801 is positioned in vertical support plate 16. Reentrant bar receiving notches 802, 803, 804 and 805 are positioned along the top and bottom edges of cutout 801. A pair of slide rods 806 and 807 are anchored to and positioned in notches 802, 803 and 804, 806. A slide block 808 is mounted on slide rods 806 and 807 for movement back and forth as shown in FIG. 11. The back and forth motion of slide block 808 is, of course, in a direction that is radially aligned with respect to the center of rotation of drum assembly 300. A recess 810 is milled in slide block 808 as shown in FIG. 11. A support arm 811 is attached by fasteners to the surface of recess 810. The support arm 811 is aligned parallel with the axis of the drum assembly 300 and is unsupported except for its attachment to slide block 808. A plurality of container bottom forming tools 812 is suspended through apertures 813. Only one tool 812 is shown and need be described since all of the tools 812 are identical. The bottom forming tool 812 contains a recessed and contoured face area 814 for defining the exact external configuration that is coined on the bottom of the container. A guide stem 815 is attached to the side of bottom forming tool 812 opposite to face area 814. The guide stem 815 passes through aperture 813 and is housed in guide cylinder 816. The guide cylinder is equipped with internal bearings which assure an uninterrupted and true motion for guide stem 815 and tool 812 as it moves into and out of engagement with the end of the container sleeve. A compression spring 817 is interdisposed between the top of support arm 811 and the bottom side of bottom forming tool 812. The spring 817 permits a regulated amount of force to be delivered to the sleeve as the container bottom is being formed.

The entire slide block 808 is moved along slide rods 806 and 807 by a linkage mechanism positioned on the back side of vertical support plate 16. A fastening bolt 818 attaches a push rod 820 to the back side of slide block 808. An articulated link 821 is used to connect to the end of an actuating arm in which the control and movement will be described elsewhere.

EJECTION MECHANISM

After the bottom closure and the rim have been formed on the sleeve, the container is complete and ready to be discharged from the apparatus 10. A fluid force such as air pressure is introduced through the container mandrel to the interior surface of the container, thus causing it to be ejected. The ejection of a perfect container is uncomplicated since the force attributable to pressure delivered within the completed container is quite adequate to transport the container from the container mandrel to, for example, transport tubes 23 as shown in FIG. 1. In those instances where for one reason or another the container is imperfect or sticks to the mandrel, a more positive way of container removal is required so that all container mandrels will be empty and ready to receive newly formed sleeves at the beginning of a new cycle of the apparatus. The following apparatus provides a positive means for removing those containers not removed by the fluid pressure exerted on the container at the normal ejection position.

Figure 12:
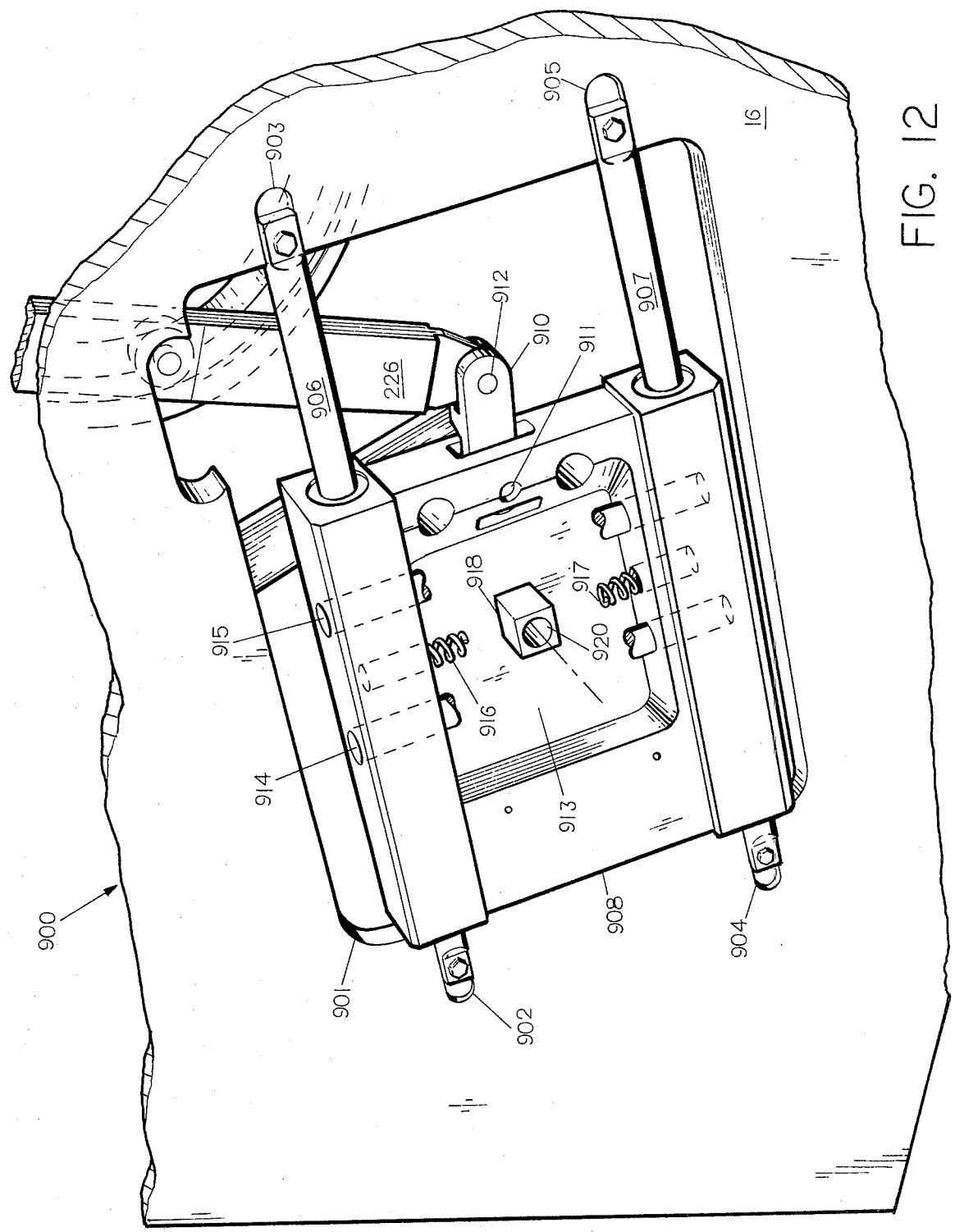
FIG. 12 is a perspective part in section and broken away view which shows the base of the ejection mechanism.

FIG. 12 shows the front side of a portion of vertical support plate 16. A window or cutout 901 is positioned in vertical support plate 16. Machined notches 902, 903, 904 and 905 are positioned along two edges of cutout 901. Slide rods 906 and 907 are respectively anchored to notches 902, 903 and 904, 905. A slide block 908 is positioned on slide rods 906 and 907 so that slide block 908 has freedom of movement within cutout 901. The entire slide block 908 is moved by means of attached link 910 which is pinned at ends 911 and 912 for rotation. The attachment arm that couples to attachment link 910 by means of pinned end 912 will be discussed elsewhere.

The slide block 908 contains a rectangular recess 913 which is milled part way through slide block 908. Guide posts 914 and 915 are anchored within the top section of slide block 908 and protrude downward to similar anchor points in the bottom section of slide block 908. A compression spring 916 is positioned within a spring well situated in the top section of slide block 908. A similar compression spring 917 is positioned in opposed relationship, with respect to spring 916, in the bottom section of slide block 908. The springs 916 and 917 are used to help control the movement of the support structure to which the container grasping arms are attached and which will be discussed below. Also shown in FIG. 12 is a centrally positioned reinforcement block 918 which is attached to the center back wall of rectangular recess 913. A through bore 920 communicates with the back side of slide block 908.

Figure 13:
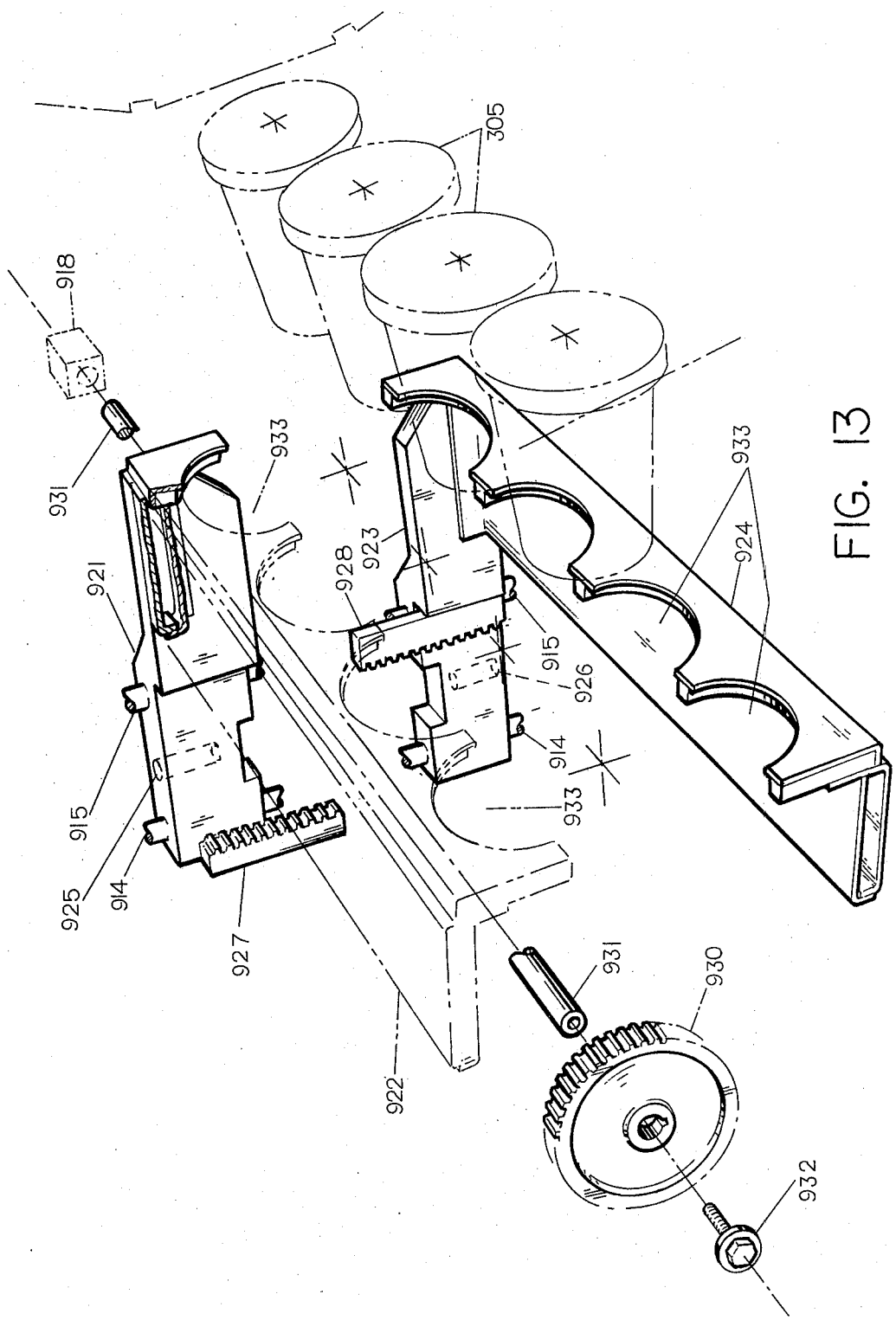
FIG. 13 is an exploded perspective view that shows the grasping arms of the ejection mechanism.

FIG. 13 is an exploded view which shows a continuation of the ejection mechanism shown also in FIG. 12. The reinforcement block 918 is shown in dotted lines at the top of FIG. 13. A slide assembly 921 and its cantilevered container grasping arm 922 is shown at the top of FIG. 13. A similar slide assembly 923 and its cantilevered container grasping arm 924 is positioned in juxtaposed relationship with slide assembly 921 and grasping arm 922. As can be seen at the top of FIG. 13, the slide assembly 921 is mounted on guide posts 914 and 915. Likewise, slide assembly 923 is mounted on the lower portion of guide posts 914 and 915. The previously shown spring 916 coacts with the spring well 925 which is drilled in slide assembly 921. A similar spring well 926 is drilled in the bottom of slide assembly 923. A rack gear 927 is attached to the side of slide assembly 921. The rack gear protrudes below slide assembly 921. A similar rack gear 928 is attached to slide assembly 923 such that its uppermost extent protrudes above slide assembly 923. The gear teeth on rack gears 927 and 928 face each other and are spaced apart so that both rack gears can be engaged with the teeth of gear 930. Gear 930 is keyed to shaft 931 and held in place by fastener 932. Shaft 931 passes through bore 920 in reinforced block 918.

When shaft 931 is rotated, gear 930 also rotates, thus causing the rack gears and the slide assemblies to move together or apart. When gear 930 rotates clockwise as viewed in FIG. 13, the container grasping arms 922 and 924 will move apart. Also, when gear 930 rotates counterclockwise, the container grasping arms 922 and 924 will close, thus permitting the arms to grasp a container should perchance a defective container remain on the container mandrels subsequent to the normal container ejection station. To aid in grasping the containers, arcuate portions 933 are provided along the edges of both container grasping arms 922 and 924.

Figure 14:
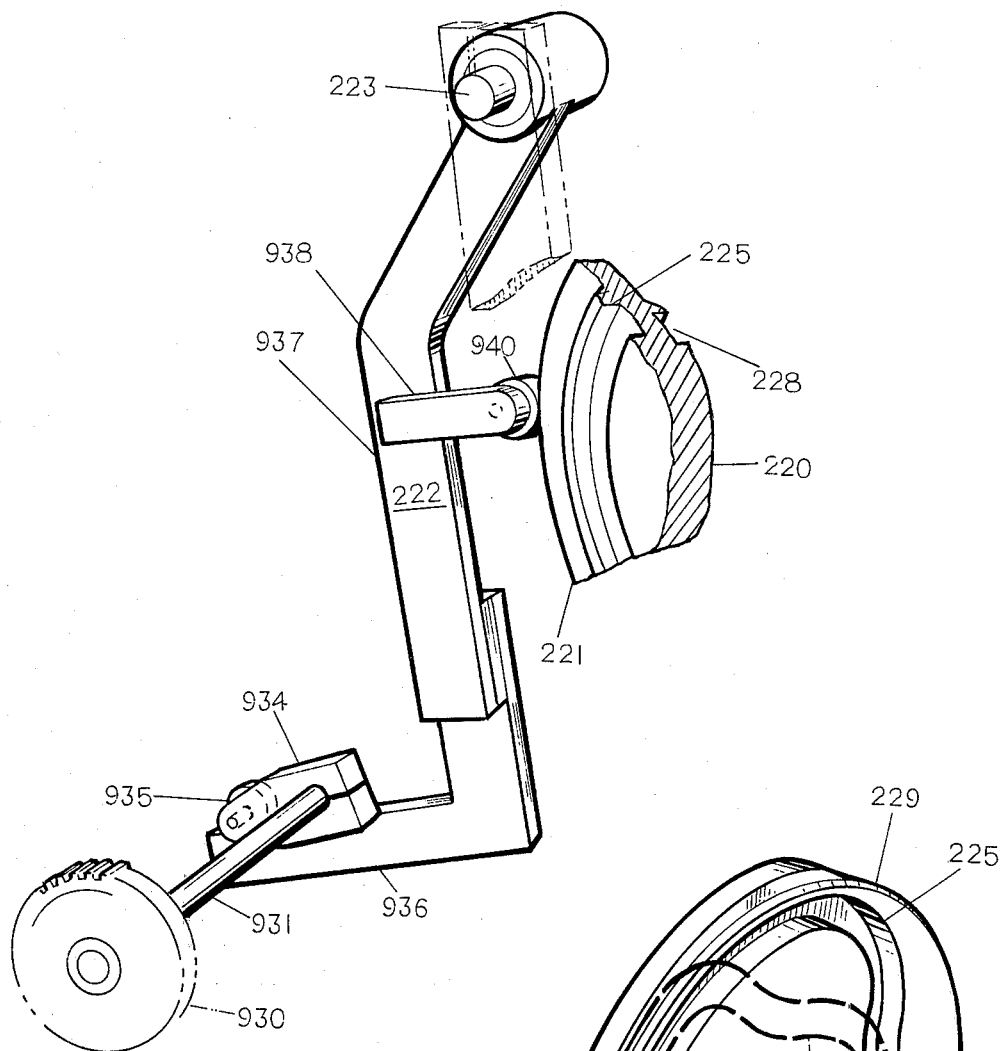
FIG. 14 is a perspective view of the drive mechanism that powers the gear and rack assembly.

FIG. 14 is a broken away perspective view of the mechanism that provides the rotational power to shaft 931. The heretofore described gear 930 and shaft 931 are shown. The end of shaft 931 remote from the attachment point of gear 930 contains a clamp bar 934 aligned at a right angle with respect to shaft 931. The end of clamp bar 934 contains a cam follower 935 that coacts with cam bar 936. Cam bar 936 is in turn attached to lever arm 937. The lever arm 937 contains an attached post 938 that has a cam follower 940 which rides on the outside of a cam wheel which will be described in fuller detail elsewhere.

OVERALL OPERATION

The various operating assemblies of the present invention have been described in detail. The interconnection between the power unit 200 and the power delivery to the operating assemblies will now be described.

Figure 15:
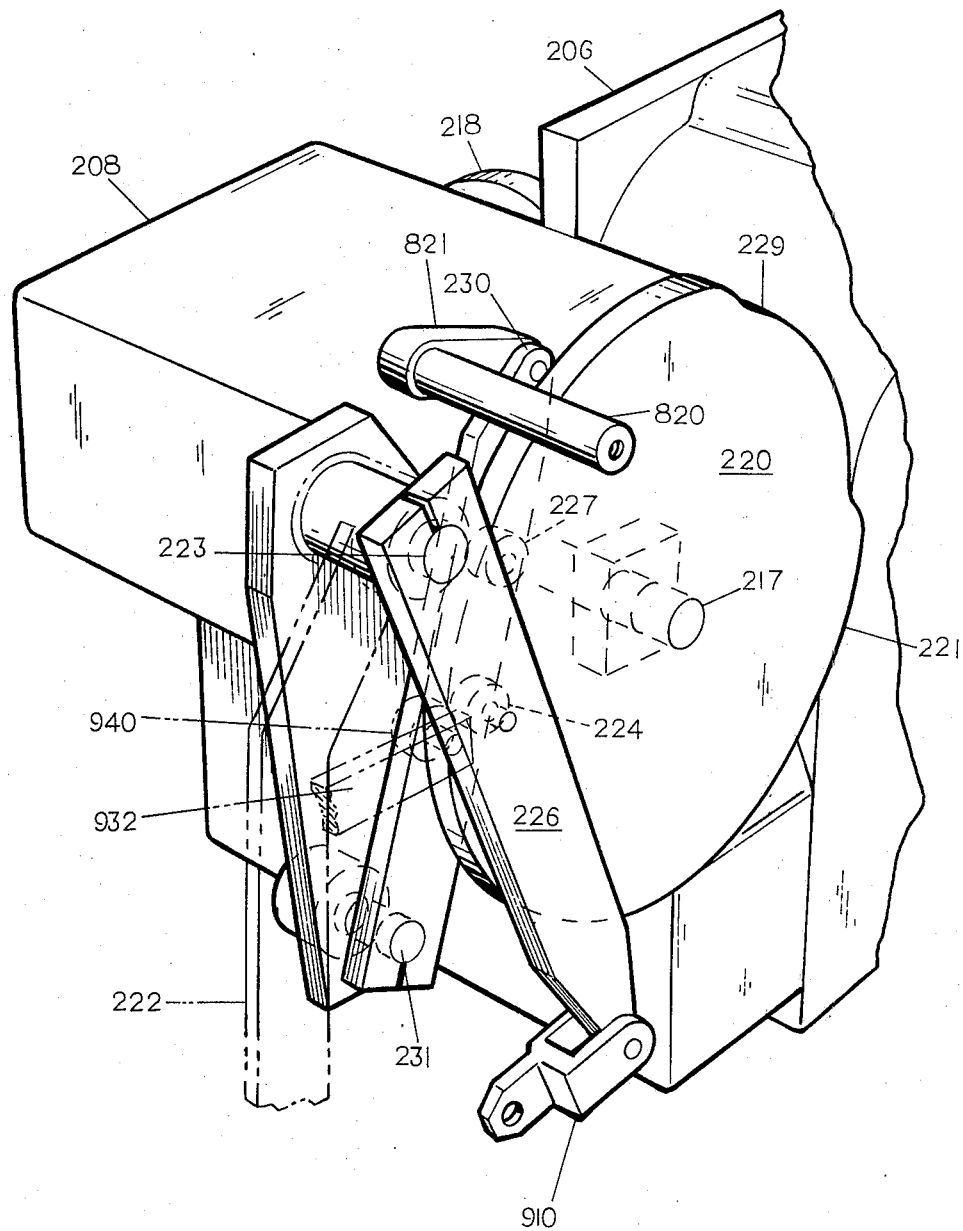
FIG. 15 is a perspective view which shows the various drive arms and their connections.

FIG. 15 is a perspective view that shows the roller index drive 206, the gear box assembly 208 and main drive shaft 217. A main cam wheel 220 is attached to the end of main drive shaft 217.

Figure 16:
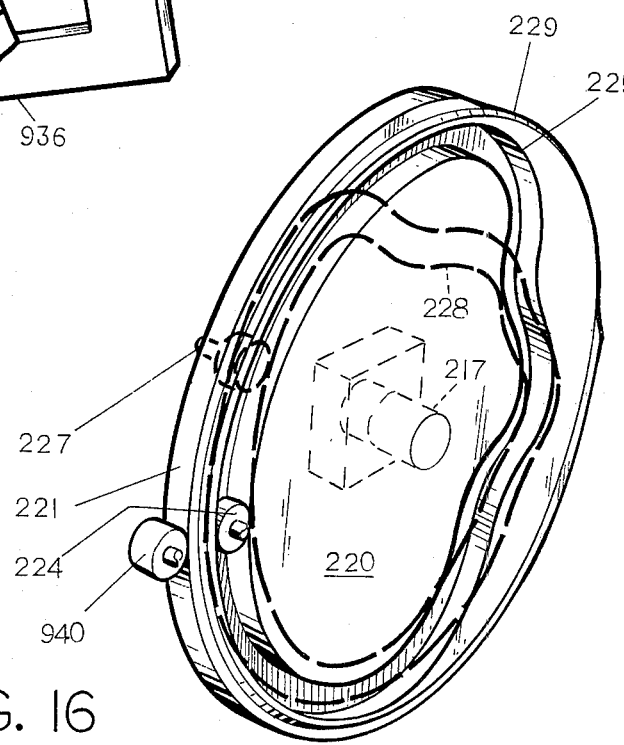
FIG. 16 is a perspective view of the main cam and its respective cam tracks.

Reference is now made to FIG. 16, which shows in perspective, main cam wheel 220. The cam wheel 220 provides guidance for three cam followers. The outer peripheral cam surface 221 provides a path for cam follower 940, which along with a section of cam 220, is also shown in FIG. 14. For most of the peripheral extent, outer cam surface 211 is cylindrical, however, for a portion 222 (FIG. 15), the outer cam surface 221 has a less radial extent than the remainder of peripheral surface 221. The change in radius of cam surface 221 permits cam follower 940 to translate, thus causing open and close arm 222 to rotate about its pivot point 223. As open and close arm 222 rotates, it causes cam bar 936 (FIG. 14) to move, thus permitting cam follower 935 and clamp bar 934 to rotate, thus opening container grasping arms 922 and 924.

As shown in FIG. 16, cam follower 224 tracks in cam groove 225 which is cut into front face of main cam wheel 220. Cam follower 224 is attached to in and out arm 226 which is pivoted at pivot point 223. As cam follower 224 traverses cam groove 225, it causes in and out arm 226 to rotate about pivot point 223. The rotation of in and out arm 226 causes link 910 to pull the entire assembly 900 toward the container mandrels that are depicted in FIG. 13.

The cam follower 227, as shown in FIG. 16, tracks in cam groove 228 which is cut into the back side of main cam wheel 220. The cam follower 227 is attached to forming arm 230 which in turn is pivoted at pivot point 231. The end of forming arm 230 opposite to pivot point 231 is attached to articulated link 821 which in turn is attached to push rod 820. Push rod 820 can be seen in FIG. 11. As push rod 820 is moved back and forth the bottom press assembly 800 is moved into and out of engagement with the container mandrels. It is the force thus applied by bottom press assembly 800 that not only forms the container bottoms, but also causes the container mandrels to form the rims on the containers.

During the sequential operation of the present invention, foam plastic sheet stock is fed into the sleeve winding mandrels shown in FIG. 1. Sleeves of plastic material are formed and are transported from the sleeve winding mandrels to the container mandrels.

Referring to FIG. 4, the transfer of the plastic sleeves occurs at station 15. The drum 305 is then indexed to station 16 where the sleeves are carefully aligned on the container mandrels 305 by the radially inward motion of sleeve positioner assembly 500. The sleeve protrudes beyond the end of the container mandrels as it begins its arcuate travel. As the sleeve is indexed through stations 1 through 4, it is acted on by hot air flowing from the individual heat sources associated with the first array of heaters. At station 2 hot air is introduced through the tubes 330 to the base of each container mandrel 305 to heat soften the bottom edge of the sleeve so that it can be later formed into a rim. The hot air groove 322 in front plate 315 begins its arcuate extent at station 2 and continues through station 10. The vacuum groove 321 also extends from station 2 to station 10 and is used to pull ambient air in and around hot air tube 330 to prevent its overheating. The sleeve then passes beneath the array of heaters associated with stations 5 through 8 to additionally shrink the material overhanging the mandrel, as well as the bottom edge of the sleeve. As an aid to the shrinking of the sleeve about the end of the container mandrel, a vacuum is introduced through vacuum groove and the end of the container mandrel beginning at station 3 and continuing until the sleeve reaches station 11. When the sleeve arrives at station 9, the bottom squeezer assembly pinches shut the heat softened shrunken plastic material that protrudes beyond the container mandrel. At this time the base of the sleeve is expanded by the action of segments in the base of the container mandrel which in turn are activated by the movement of cam pins 348. At station 10, the bottom press assembly 800 forms the container bottom and simultaneously forms the container rim. The heat to the base of the mandrel is halted, as well as the vacuum to the container mandrel. As the completed container arrives at station 11, the vacuum to the mandrel is replaced by a positive air pressure produced by pressure groove 354 and its associated pressure communication lines. The positive pressure discharges the container from the container mandrel into an adjacent transport tube 23. If a container is not removed by the positive internal pressure, the container continues on to station 12 where it is mechanically stripped from the container mandrel by the grasping action of the ejection assembly 900. The stations 13 and 14 remain idle while the empty container mandrels move once again into position for another sleeve pickup at station 15.

The present invention may undergo variations as would occur to those persons of ordinary skill in the art without departing from the spirit and scope of the invention.

What is claimed is:

1. An apparatus for the manufacture of a container of heat-shrinkable thermoplastic material comprising sleeve winding means for forming an open ended sleeve with a liquid impervious side seam, drum means, mounted for rotation about a horizontal axis, positioned adjacent to said sleeve winding means and supporting a plurality of container mandrels each in radial alignment with said drum means, sleeve transfer means for transporting said sleeve from the sleeve winding means to one of the mandrels on said drum means, an array of heat dispensing means positioned adjacent said drum means for heat softening and shrinking said sleeve into partial conformity with the exterior surface of the mandrel supporting said sleeve, means for pressing a portion of the heat softened sleeve into an end closure for said container and container ejection means for removing said container from said mandrel.

2. An apparatus for the manufacture of a container of heat-shrinkable thermoplastic material comprising sleeve winding means for forming an open ended cylindrical sleeve with a liquid impervious side seam, drum means mounted for rotation about a horizontal axis and carrying a plurality of circumferentially spaced container mandrels each in radial alignment with said drum means, said drum means positioned adjacent to said sleeve winding means so that the longitudinal axis of said container mandrels passes into alignment with the longitudinal axis of the sleeve carrying portion of said sleeve winding means, sleeve transfer means positioned adjacent said sleeve winding means and said drum means for transporting said sleeve from the sleeve winding means to one of the container mandrels on said drum means, an array of heat dispensing means positioned adjacent said drum means for heat softening and shrinking said sleeve into partial conformity with the exterior surface of the mandrel supporting said sleeve, means for pressing a portion of the heat softened sleeve into an end closure for said container and ejection means coacting with said mandrel for removing said container from said mandrel.

3. An apparatus for the manufacture of containers of heat-shrinkable thermoplastic material comprising sleeve winding means for forming open ended cylindrical sleeves on a sleeve winding mandrel, said sleeves having a liquid impervious side seam, drum means mounted for rotation about a horizontal axis and carrying a plurality of circumferentially spaced container mandrels each in radial alignment and perpendicular with the rotational axis of said drum means, said drum means positioned adjacent to said sleeve winding means so that the longitudinal axis of said container mandrel passes into linear alignment with the longitudinal axis of the sleeve winding mandrel positioned on said sleeve winding means, sleeve transfer means positioned adjacent said sleeve winding mandrel and said container mandrel for transporting said sleeve from the sleeve winding mandrel to one of the container mandrels on said drum means, an array of heat dispensing means positioned adjacent said drum means for heat softening and shrinking said sleeve into partial conformity with the exterior surface of the mandrel supporting said sleeve, means positioned adjacent to and in radial alignment with the container mandrels for pressing a portion of the heat softened sleeve into an end closure for said container and ejection means associated with said container mandrel for removing said container from said container mandrel.

4. An apparatus for the manufacture of containers of heat-shrinkable thermoplastic material comprising sleeve winding means for forming open ended cylindrical sleeves, from rectangular shaped blanks, on a sleeve winding mandrel, said sleeves having a liquid impervious side seam, drum means mounted for rotation about a horizontal axis and carrying a plurality of container mandrels each equally spaced circumferentially from each other and in radial alignment and perpendicular with the rotational axis of said drum means, said drum means positioned adjacent to said sleeve winding means so that the longitudinal axis of said container mandrel passes into linear alignment with the longitudinal axis of the sleeve winding mandrel positioned on said sleeve winding means, sleeve transfer means positioned adjacent said sleeve winding mandrel and said container mandrel for grasping and transporting said sleeve from the sleeve winding mandrel to one of the container mandrels on said drum means, an array of heated fluid dispensing means positioned adjacent said drum means for heat softening and shrinking said sleeve into partial conformity with the exterior surface of the container mandrel supporting said sleeve, means positioned adjacent to said drum means for closing the ends of the heat softened sleeve, means positioned adjacent to and in radial alignment with the container mandrel for pressing at least a portion of the closed end into an end closure for said container and ejection means associated with said container mandrel for removing said container from said container mandrel.

5. An apparatus for the manufacture of containers of heat-shrinkable thermoplastic material comprising sleeve winding means for forming open ended cylindrical sleeves, from rectangular shaped blanks, on a sleeve winding mandrel, said sleeves having a liquid impervious side seam, drum means mounted for rotation about a horizontal axis and carrying a plurality of container mandrels each equally spaced circumferentially from each other and in radial alignment and perpendicular with the rotational axis of said drum means, said drum means positioned adjacent to said sleeve winding means so that the longitudinal axis of said container mandrel passes into linear alignment with the longitudinal axis of the sleeve winding mandrel positioned on said sleeve winding means, sleeve transfer means positioned adjacent said sleeve winding mandrel and said container mandrel for grasping and transporting said sleeve from the sleeve winding mandrel to one of the container mandrels on said drum means, an array of heated fluid dispensing means positioned adjacent said drum means for heat softening and shrinking said sleeve into partial conformity with the exterior surface of the container mandrel supporting said sleeve, means positioned adjacent to said drum means for closing the ends of the heat softened sleeve, means positioned adjacent to and in radial alignment with the container mandrel for pressing at least a portion of the closed sleeve end into an end closure for said container, and ejection means positioned within and adjacent said container mandrel for removing the container from said container mandrel.

6. An apparatus for the manufacture of containers of heat-shrinkable thermoplastic material comprising sleeve winding means for forming open ended cylindrical sleeves, from rectangular shaped blanks, having a major amount of orientation in the circumferential direction, on a sleeve winding mandrel, said sleeves having a liquid impervious side seam formed from the overlapped ends of said blank, drum means mounted for rotation about a horizontal axis and carrying a plurality of container mandrels each equally spaced circumferentially from each other and in radial alignment and perpendicular with the rotational axis of said drum means, said drum means positioned adjacent and rotated in synchronization with said sleeve winding means, the longitudinal axis of said container mandrel positioned so that it passes into linear alignment with the longitudinal axis of the sleeve winding mandrel positioned on said sleeve winding means, sleeve transfer means positioned adjacent said sleeve winding mandrel and said container mandrel for grasping and transporting said sleeve from the sleeve winding mandrel to one of the container mandrels on said drum means, means positioned adjacent to said container mandrel path for positioning said sleeve in proper location on said container mandrel so that a portion of the sleeve protrudes beyond the end of the container mandrel, an array of heated fluid dispensing means positioned adjacent said drum means for heat softening and shrinking said sleeve into partial conformity with the exterior surface of the container mandrel supporting said sleeve, means positioned adjacent to said drum means for closing the ends of the heat softened sleeve, means positioned adjacent to and in radial alignment with the container mandrel for pressing the heat softened closed portion of the sleeve into an end closure for said container, and ejection positioned within said container mandrel for removing the container from said container mandrel.

7. An apparatus for the manufacture of containers of heat-shrinkable thermoplastic material comprising sleeve winding means for forming a plurality of open ended cylindrical sleeves, from rectangular shaped blanks, having a major amount of orientation in the circumferential direction, on sleeve winding mandrels, said sleeves having a liquid impervious side seam formed from the overlapped ends of said blank, drum means mounted for rotation about a horizontal axis and carrying a plurality of container mandrels aligned in a plurality of rows and each equally spaced circumferentially from each other in said rows and perpendicular with the rotational axis of said drum means, said drum means positioned adjacent and rotated in synchronization with said sleeve winding means, the longitudinal axis of each of said container mandrels in one row positioned so that said axis passes into linear alignment with the longitudinal axis of one of the sleeve winding mandrels on said sleeve winding means, sleeve transfer means for transferring in a plurality of sleeves from said sleeve winding mandrels to said container mandrels, said transfer means positioned adjacent said sleeve winding mandrels and said container mandrels for grasping and transporting said sleeves from the sleeve winding mandrels to a plurality of the container mandrels on said drum means, means positioned adjacent to said container mandrel paths for positioning a plurality of sleeves in proper location on said container mandrels so that a portion of the sleeves protrudes beyond the ends of the container mandrels, an array of heated fluid dispensing means positioned adjacent said drum means for heat softening and shrinking said sleeves into partial conformity with the exterior surface of the respective container mandrels supporting said sleeves, means positioned adjacent to said drum means for closing the ends of the heat softened sleeves, means associated with said container mandrels for forming reinforced rims on the ends of said sleeves opposite said end closures and ejection means positioned within said container mandrels for removing the containers from said container mandrels.

8. An apparatus for the manufacture of containers of heat-shrinkable thermoplastic material comprising a plurality of sleeve winding means each having a plurality of sleeve winding mandrels for forming a plurality of open ended cylindircal sleeves, from rectangular shaped blanks, having a major amount of orientation in the circumferential direction, on sleeve winding mandrels, said sleeves having a liquid impervious side seam formed from the overlapped ends of said blank, drum means mounted for rotation about a horizontal axis and carrying a plurality of container mandrels aligned in a plurality of concentric rows and each equally spaced circumferentially from each other in said rows and perpendicular with the rotational axis of said drum means, said drum means positioned adjacent and rotated in synchronization with said sleeve winding means, the longitudinal axis of each of said container mandrels in one row positioned so that it passes into linear alignment with the longitudinal axis of one of the sleeve winding mandrels on said sleeve winding means, a plurality of sleeve transfer means for transferring a plurality of sleeves from the sleeve winding mandrels of each sleeve winding means to said container mandrels, each of said transfer means positioned adjacent its associated sleeve winding means and said container mandrels for grasping and transporting a plurality of said sleeves from the sleeve winding mandrels to a plurality of the container mandrels on said drum means, means positioned adjacent to said container mandrel arcuate paths for positioning a plurality of sleeves in proper location on said container mandrels so that a portion of the sleeves protrudes beyond the ends of the container mandrels, an array of heated fluid dispensing means positioned adjacent said drum means for heat softening and shrinking said sleeves into partial conformity with the exterior surface of the respective container mandrels supporting said sleeves, means positioned adjacent to said drum means for closing the ends of the heat softened sleeves, means positioned adjacent to and in radial alignment with the container mandrels for pressing the heat softened closed portion of a plurality of sleeves into end closures for said containers, and ejection means positioned within said container mandrels for removing the containers from said container mandrels.

9. An apparatus for the manufacture of containers of heat-shrinkable thermoplastic material comprising a plurality sleeve winding means each having two sleeve winding mandrels for forming a plurality of open ended cylindrical sleeves, from rectangular shaped blanks, having a major amount of orientation in the circumferential direction, on sleeve winding mandrels, said sleeves having a liquid impervious side seam formed from the overlapped ends of said blank, drum means mounted for rotation about a horizontal axis and carrying a plurality of container mandrels aligned in four concentric rows and each equally spaced circumferentially from each other in said rows and perpendicular with the rotational axis of said drum means, said drum means positioned adjacent and rotated in synchronization with said sleeve winding means, said sleeve winding means positioned in opposed relationship such that one of said sleeve winding means contains sleeve winding mandrels in alignment with the first and third rows of container mandrels on said drum means and the other of said sleeve winding means contains sleeve winding mandrels in alignment with the second and fourth rows of container mandrels on said drum means, the longitudinal axis of each of said container mandrels in one row positioned so that it passes into linear alignment with the longitudinal axis of one of the sleeve winding mandrels on said sleeve winding means, a plurality of sleeve transfer means for transferring a plurality of sleeves from the sleeve winding mandrels of each sleeve winding means to said container mandrels, each of said transfer means positioned adjacent its associated sleeve winding means and said container mandrels for grasping and transporting a plurality of said sleeves from the sleeve winding mandrels to a plurality of the container mandrels on said drum means, means positioned adjacent to said container mandrel row paths for positioning all of said sleeves in proper location on said container mandrels so that a portion of the sleeves protrudes beyond the ends of the container mandrels, a first array of heated fluid dispensing means positioned adjacent said drum means so that said container mandrels pass thereby, a second array of heated fluid dispensing means positioned adjacent said drum means so that said container mandrels pass thereby, said first and second fluid dispensing means heat softening and shrinking said sleeves into partial conformity with the exterior surface of the respective container mandrels supporting said sleeves, means positioned adjacent to said drum means for closing the ends of the heat softened sleeves, means positioned adjacent to and in radial alignment with the container mandrels for pressing the heat softened closed portion of a plurality of sleeves into end closures for said containers, and ejection means positioned within said container mandrels for removing the containers from said container mandrels.

10. An apparatus for the manufacture of cup-like containers of heat-shrinkable thermoplastic material comprising a plurality sleeve winding means each having two sleeve winding mandrels for forming a plurality of open ended cylindrical sleeves, from rectangular shaped blanks, having a major amount of orientation in the circumferential direction, on sleeve winding mandrels, said sleeves having a liquid impervious side seam formed from the overlapped ends of said blank, drum means mounted for indexing rotation through a plurality of steps about a horizontal axis and carrying a plurality of container mandrels aligned in four axially spaced arcuate rows and each equally spaced circumferentially from each other in said arcuate rows and perpendicular with the rotational axis of said drum means, said container mandrels in said four arcuate rows forming linear rows parallel to the axis of rotation of said drum means, said drum means positioned adjacent and rotated in synchronization with said sleeve winding means, said sleeve winding means positioned in opposed relationship such that one of said sleeve winding means contains sleeve winding mandrels in alignment with the first and third arcuate rows of container mandrels on said drum means and the other of said sleeve winding means contains sleeve winding mandrels in alignment with the second and fourth arcuate rows of container mandrels on said drum means, the longitudinal axis of each of said container mandrels in one arcuate row positioned so that it passes into linear alignment with the longitudinal axis of one of the sleeve winding mandrels on said sleeve winding means, a plurality of sleeve transfer means for transferring a plurality of sleeves from the sleeve winding mandrels of each sleeve winding means to said container mandrels, each of said transfer means positioned adjacent its associated sleeve winding means and said container mandrels for grasping and transporting a plurality of said sleeves from the sleeve winding mandrels to a plurality of the container mandrels on said drum means, means positioned adjacent to said container mandrel linear rows for positioning all of said sleeves in proper location on said container mandrels so that a portion of the sleeves protrudes beyond the ends of the container mandrels, a first array of heated fluid dispensing means positioned adjacent said drum means so that said container mandrels pass thereby, a second array of heated fluid dispensing means positioned adjacent said drum means so that said container mandrels pass thereby, said first and second fluid dispensing means heat softening and shrinking said sleeves into partial conformity with the exterior surface of the respective container mandrels supporting said sleeves, means positioned adjacent to said drum means for closing the ends of the heat softened sleeves, means positioned adjacent to and in radial alignment with the container mandrels for pressing the heat softened closed portion of a plurality of sleeves in a linear row into end closures for said containers, a first ejection means positioned within said container mandrels for removing the containers from said container mandrels, transporting means for transporting said containers away from said container mandrels, and second container ejection means positioned adjacent said first ejection means to remove containers not removed by said first ejection means.

11. A machine for the manufacture of cup-shaped containers of heat-shrinkable oriented thermoplastic material comprising a base structure and sleeve winding means positioned thereon for forming an open ended sleeve with a liquid impervious side seam, an upright support column attached to said base structure motor means attached to said column, rotatable cylindrical drum means with a horizontal axis of rotation mounted to said column and positioned adjacent said sleeve winding means, gear means connected between said motor means and said drum means for rotating said drum means, a plurality of outwardly cantilevered container mandrels attached to said drum means, sleeve transfer means for transporting said sleeve from the sleeve winding means to said container mandrels, heat dispensing means positioned adjacent said drum means for heat softening and shrinking said sleeve into partial conformity with the container mandrel supporting said sleeve, means for forming a portion of the heat softened sleeve into an end closure for said container and container removal means for removing said container from said mandrel.

12. A machine as claimed in claim 11 wherein reciprocating sleeve positioning means is positioned in radial alignment with said drum means, said sleeve positioning means seating the sleeves on said container mandrels subsequent to the transfer of the sleeve from the sleeve winding means.

13. A machine as claimed in claim 11 wherein said drum means contains a plurality of container mandrels spaced in radial alignment about and attached to said drum means.

14. A machine as claimed in claim 13 wherein said container mandrels are actuated by means carried by said drum means.

15. A machine as claimed in claim 13 wherein said container mandrels are positioned in a plurality of arcuately aligned rows about said drum means.

16. A machine as claimed in claim 11 wherein said sleeve winding means contains a plurality of sleeve winding mandrels the longitudinal axis of which is in radial alignment with said drum means.

17. A machine as claimed in claim 16 wherein said sleeve winding means is divided into two units each containing a plurality of sleeve winding mandrels, the radial alignment of the sleeve winding mandrels of one unit being arcuately displaced from the radial alignment of the sleeve winding mandrels of the other units.

18. A machine as claimed in claim 11 wherein said sleeve transfer means is aligned for movement parallel to the axis of said sleeve winding mandrels.

19. A machine as claimed in claim 18 wherein said sleeve transfer means is equipped with vacuum means for grasping sleeves on said sleeve winding mandrels.

20. A machine as claimed in claim 11 wherein said heat dispensing means is positioned in an arcuate array around at least a portion of the arcuate extent of said drum means.

21. A machine as claimed in claim 11 wherein the means for forming the heat softened sleeve into an end closure is comprised of a squeeze unit and a press unit.

22. A machine as claimed in claim 21 wherein said squeeze unit is positioned adjacent to said drum means, said squeeze unit containing a plurality of opposed movable fingers for contacting and pinching together the shrunken portion of said sleeve that is cantilevered from the end of said container mandrel.

23. A machine as claimed in claim 21 wherein the press unit is positioned adjacent to said drum means, said press unit comprised of a plurality of press pads each in radial alignment with said drum means, said pads biased radically inward toward said container mandrels to compress the pinched together portion of said sleeves against the end of said sleeve mandrels to form bottom closures on said containers.

24. A machine as claimed in claim 11 wherein the container removal means comprises a first removal means and a second removal means.

25. A machine as claimed in claim 24 wherein said second removal means comprises a pair of opposed jaws for grasping the exterior of said containers and pulling them from said mandrel, said second removal means utilized to remove containers not removed from said container mandrels by said first removal means.

* * * * *